United States Patent [19]

Udagawa et al.

[11] Patent Number: 5,181,105
[45] Date of Patent: Jan. 19, 1993

[54] COLOR IMAGE CORRECTION BASED ON CHARACTERISTICS OF A HIGHLIGHTS OR OTHER PREDETERMINED IMAGE PORTION

[75] Inventors: Yoshiro Udagawa, Tokyo; Hideo Takiguchi, Yokohama, both of Japan

[73] Assignee: Canon Kabushiki Kaisha, Tokyo, Japan

[21] Appl. No.: 739,660

[22] Filed: Aug. 2, 1991

Related U.S. Application Data

[60] Division of Ser. No. 560,295, Jul. 29, 1990, which is a continuation of Ser. No. 54,588, May 27, 1987.

[30] Foreign Application Priority Data

| May 30, 1986 [JP] | Japan | 61-123716 |
|---|---|---|
| May 30, 1986 [JP] | Japan | 61-123717 |
| May 30, 1986 [JP] | Japan | 61-123718 |
| May 30, 1986 [JP] | Japan | 61-123719 |
| May 30, 1986 [JP] | Japan | 61-123720 |
| May 30, 1986 [JP] | Japan | 61-123721 |
| May 30, 1986 [JP] | Japan | 61-123722 |
| May 30, 1986 [JP] | Japan | 61-123723 |

[51] Int. Cl.$^5$ .......... H04N 9/74; G03F 3/08
[52] U.S. Cl. .......... 358/80; 358/22; 358/261.1
[58] Field of Search .......... 358/75, 78, 80, 461, 358/22, 41, 43, 44, 29

[56] References Cited

U.S. PATENT DOCUMENTS

| 4,668,679 | 5/1987 | Jüng. | |
| 4,733,295 | 3/1988 | Hemsky et al. | |
| 4,763,186 | 8/1988 | Belmares-Sarabia et al. | |
| 4,908,701 | 3/1990 | Udagawa | 358/75 |
| 5,060,060 | 10/1991 | Udagawa et al. | |
| 5,081,535 | 1/1992 | Kondo et al. | 358/228 |
| 5,099,341 | 3/1992 | Nosaki et al. | 358/461 |
| 5,119,180 | 6/1992 | Okamoto | 358/44 |

*Primary Examiner*—Edward L. Coles, Sr.
*Assistant Examiner*—Kim Yen Vu
*Attorney, Agent, or Firm*—Fitzpatrick, Cella, Harper & Scinto

[57] ABSTRACT

A color image processing apparatus comprises: a circuit to provide a color image signal consisting of a luminance signal and two color difference signals; a converter to convert the two color difference signals into the hue signal and saturation signal; a compressing circuit to independently compress the dynamic ranges of one of or both of the luminance signal and the saturation signal and to output; a memory to store the hue signal and the output of the compressing circuit; and a color printer to reproduce the color image on the basis of the hue signal, saturation signal, and luminance signal stored in the memory. The compressing circuit performs the compression on the basis of a frequency distribution of the input signal levels. With this apparatus, the color balance can be automatically adjusted by use of correction ROMs of a small memory capacity.

25 Claims, 21 Drawing Sheets

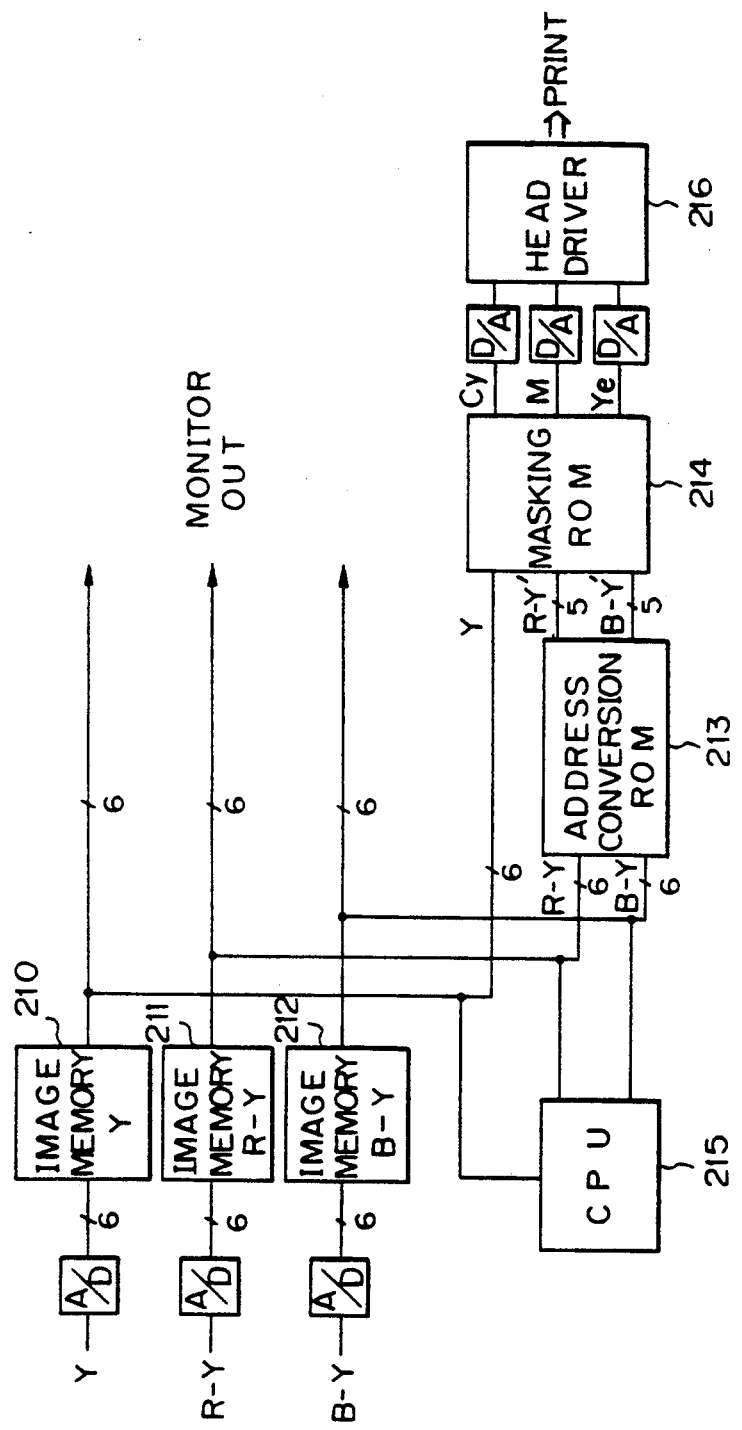

COLOR IMAGE CORRECTION BASED ON CHARACTERISTICS OF A HIGHLIGHTS OR OTHER PREDETERMINED IMAGE PORTION

This application is a division of application Ser. No. 07/560,295 filed Jul. 29, 1990, which was a continuation of application Ser. No. 07/054,588 filed on May 27, 1987.

FIELD OF THE INVENTION

The present invention relates to color image processing method and apparatus for processing a color image signal.

BACKGROUND OF THE INVENTION

For example, in a conventional color video printer or the like, the Cy (cyan), M (magenta), and Ye (yellow) signals are mainly processed. FIG. 2 shows an example of the processes. The A/D converted RGB signals are LOG converted into the Cy, M, and Ye signals. Further, these signals are subjected to the masking correction and become Cy', M', and Ye' signals. These signals are input to a head driver and the heads are driven, so that a color image is printed. The masking correction is performed by the following matrix arithmetic operation.

$$\begin{bmatrix} Cy' \\ M' \\ Ye' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Cy \\ M \\ Ye \end{bmatrix}$$

However, this method has a drawback such that the good color reproduction is not obtained. Namely, if the logarithm conversion is simply performed, there is a case such that the concentration becomes a value above 3.0 because of the difference of the dynamic range of the input image signal and the difference of the reproducing range of the ink of the output. In such a case, the concentration obviously exceeds the maximum concentration of the print. On the other hand, a method of correcting the concentration range by the gamma conversion process is used. However, this method has a drawback such that the saturation changes and the reproduced color image differs from the original image.

Even in a color display apparatus as well as the foregoing color printer, as shown in FIG. 13, a frame buffer is necessary every image signal in order to display a color image. In this case, a problem occurs with respect to which kind of image signal is stored into the frame buffer. Namely, in the conventional example of FIG. 13, the RGB signals are converted by the matrix conversion into the luminance signal Y and two color difference signals (R−Y and B−Y). The Y, R−Y, and B−Y signals are stored and thereafter, the necessary image processes are performed. For example, in the case of displaying the color image by CRT device (not shown), those signals are again converted into the RGB signals and output. The storage of the color image signal into, e.g., the frame buffer or the like causes a problem. If the number of pixels cannot be reduced in the case of saving the memory capacity, the bit number in the direction of depth of the color image signal cannot help decreasing. However, hitherto, for example, when the number of bits in the depth direction of each of two color difference signals is set to six, there is a problem such that a difference occurs between the original image and the reproduced color image because of the decrease in number of bits. To avoid such a problem, eight bits are certainly needed to obtain the good color reproduction. Due to such a situation, since the number of memories cannot be reduced, the memory capacity and the cost increase.

On the other hand, hitherto, two kinds of methods have been generally used in order to obtain the good color balance of the image.

(1) The color balance is adjusted before photographing.

(2) The photographed image is corrected.

The method of the above item (1) corresponds to "the white balance switch" of a video camera. A white paper or the like is photographed prior to starting the photographing operation and the white balance is set using the "white" image as a reference. The method of item (2) is widely used in the printing field and the like. However, it largely depends on the feeling and experience of the craftsman.

Therefore, in the case of the method (2), hitherto, it is impossible to automatically set the color balance.

In the case of digitizing, hitherto, for example, the least significant bit is omitted or the data is merely compressed at regular interval. In the case of digitizing at regular interval, unless there is a limitation of the capacity of an ROM, the color reproducibility is improved more and more as the interval is fine. However, there is a certain limitation of the ROM capacity as mentioned above.

When the saturation distribution of the color image signal from the actual natural image is examined, it will be understood that it is a rare case that the color image signals are uniformly distributed in the color space, and in most cases, the color image signal falls within a region below the half value of the maximum saturation as shown in FIG. 20.

Since it is considered that the influence on the color reproducibility of the whole image by the color of a certain saturation corresponds to the number of pixels having the saturation, the influence of the pixels in the portion having a large saturation with a small distribution is relatively small. Therefore, in the case of constituting the masking ROM by the digitization of the equivalent interval, the portion corresponding to the high saturation in the ROM occupies a constant capacity although it is hardly used for the masking. Therefore, this portion is the vain portion. Namely, in order to obtain the high color reproducibility, the portion of a relatively low saturation in which many pixels are distributed must be finely digitized. Thus, the capacity of the ROM increases and the vain degree also increases.

SUMMARY OF THE INVENTION

It is an object of the present invention to provide color image processing method and apparatus which can eliminate the foregoing drawbacks of the conventional techniques.

Another object of the invention is to provide color image processing method and apparatus in which the memory capacity is reduced without deteriorating the color image quality.

Still another object of the invention is to provide color image processing method and apparatus in which even in the case of an input color image signal having any dynamic range, the good color reproducibility can be derived.

Still another object of the invention is to provide color image processing method and apparatus in which the color image signal is output as an image signal which is close to the memory color which the human being feels preferable.

Still another object of the invention is to provide color image processing method and apparatus in which even in the case of a color correction processing table having less capacity, the higher color reproducibility is maintained.

Still another object of the invention is to provide color image processing method and apparatus which can automatically adjust the color balance.

The above and other objects and features of the present invention will become apparent from the following detailed description and the appended claims with reference to the accompanying drawings.

BRIEF DESCRIPTION OF THE DRAWINGS

FIG. 19 is a block diagram of a color video printer according to the embodiment;

DETAILED DESCRIPTION OF THE PREFERRED EMBODIMENTS

An embodiment according to the invention will be described in detail hereinbelow with reference to the drawings.

OUTLINE OF THE FIRST EMBODIMENT

Figure 1:
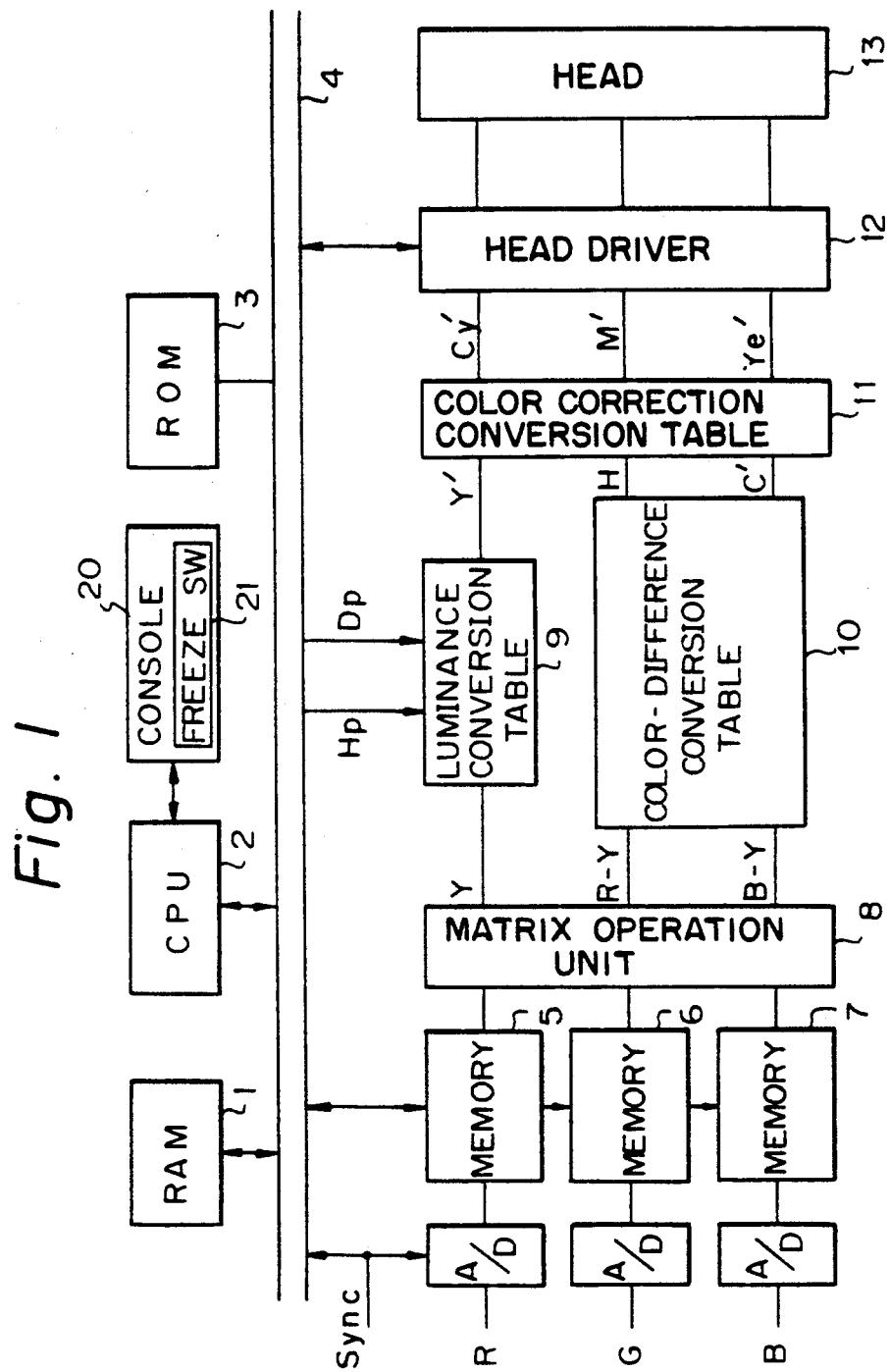
FIG. 1 is a block diagram of an embodiment when the present invention is applied to a color video printer.
Figure 2:
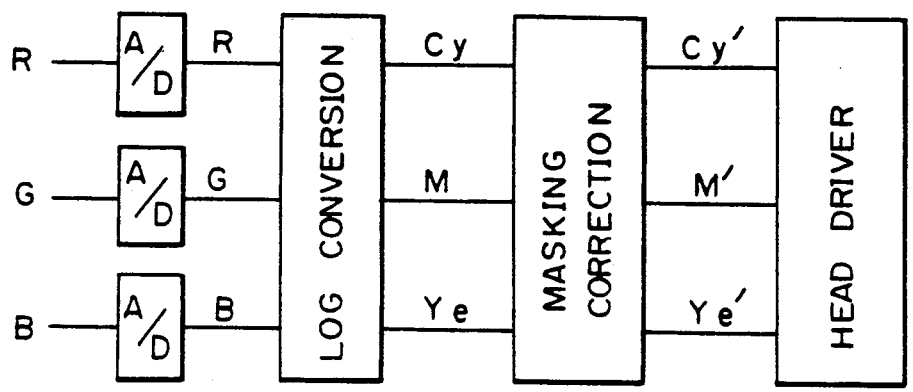
FIG. 2 is a diagram for explaining a conventional example.

As a color processing system for realizing the good color reproduction, an image processing system for processing by the luminance and color differences has been known. FIG. 1 shows an embodiment in which a constitution of a fundamental processing block was applied to a color video printer. After the RGB signals were A/D converted, they are stored into image memories 5, 6, and 7, respectively. These signals are matrix-operated by a matrix operation unit 8 and converted into a luminance signal Y and color difference signals $R-Y$ and $B-Y$.

These luminance and color difference signals are subjected to predetermined converting processes, which will be explained hereinafter, by conversion tables 9 and 10 and converted into luminance (Y'), hue (H) and saturation (C). The luminance conversion table 9 is provided to obtain the luminance Y' by normalizing the luminance Y in order to match the dynamic range of the input image signal with the reproduction range of the output (e.g., ink). The normalization and compression are performed by the conversion from Y to Y'. The color difference conversion table 10 is provided to compress the dynamic range in the direction of the saturation C so as not to lose the color reproducibility. In this embodiment, as shown in FIG. 1, both of the luminance conversion and the color difference conversion are performed. However, when considering the viewpoints such that the good color reproducibility is held and the dynamic range is compressed, even if only either one of the luminance conversion and color difference conversion is independently performed, the similar effect can be obtained as will be clearly understood from the description hereinafter.

The luminance (Y'), hue (H), and saturation (C') are converted into the recording chrominance signal components of Cy (cyan), M (magenta), and Ye (yellow) by a color correction conversion table 11. Further, these components are subjected to the masking correction to correct the uneven color components of the ink and input to a head driver 12 and printed. The outline of the first embodiment is as explained above. The first embodiment will be further described in detail hereinbelow.

CONVERSION INTO THE LUMINANCE AND COLOR DIFFERENCE

After the RGB signals were A/D converted, they are stored into the memories 5 to 7 and matrix operated on the basis of the following matrix arithmetic operation of 3×3 matrix.

$$\begin{bmatrix} Y \\ R-Y \\ B-Y \end{bmatrix} = \begin{bmatrix} 0.3 & 0.59 & 0.11 \\ 0.7 & -0.59 & -0.11 \\ -0.3 & -0.59 & -0.89 \end{bmatrix} \begin{bmatrix} R \\ G \\ B \end{bmatrix}$$

The reason why the image signal is stored into the memory is mainly because the luminance conversion, which will be explained hereinafter, needs the image of one picture plane in order to examine the dynamic range in the image signal in one picture plane of the input. Therefore, in the embodiment of FIG. 1, the luminance conversion, which will be explained hereinafter, is performed after the RGB signals stored into the memories 5 to 7 were converted into the luminance signal Y and color difference signals R−Y and B−Y. If the high speed process is further needed, the memories 5 to 7 are provided at the post stage of the matrix operation unit 8. The input RGB signals are directly matrix operated and converted into the luminance signal and color difference signals. These signals are stored into the memories 5 to 7.

The freeze (storage into the memories) of the image signals in the memories as mentioned above is performed at a timing when a freeze switch 21 on a console 20 is turned on.

CONVERSION (GRADATION CONVERSION) OF THE LUMINANCE SIGNAL

The conversion of the luminance signal in the luminance conversion table 9 is performed to reduce the difference between the input dynamic range and the reproducible range of the output as mentioned above. However, when this difference is compensated, it is desirable that the input dynamic range is not narrowed as possible. Therefore, in this embodiment, the dynamic range of the luminance signal Y of the input image signal is examined, thereby selecting the conversion characteristic which is optimum to the input.

Figure 3:
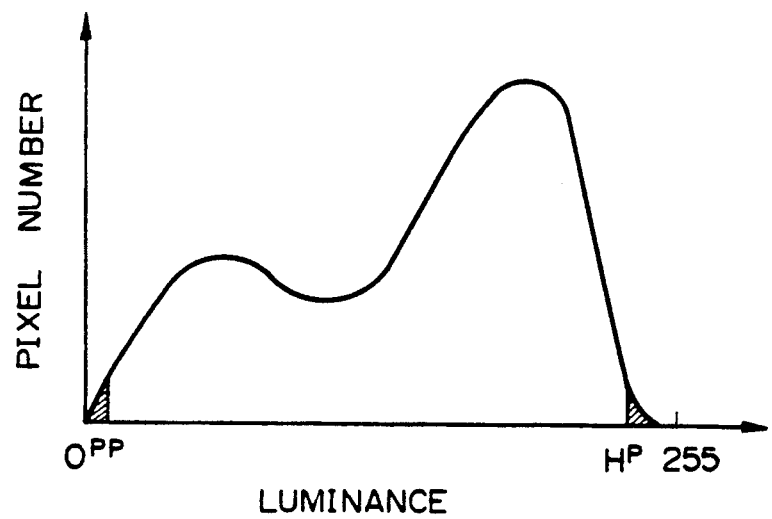
FIG. 3 is a diagram showing an example of a histogram of a luminance signal.
Figure 9A:
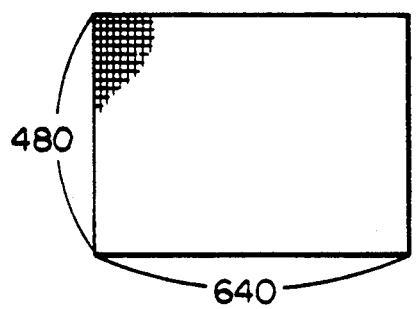
FIGS. 9A to 9C are diagrams for explaining the sampling process of the pixels when the histogram is obtained.

The dynamic range regarding the luminance in the image stored in the memory by the freeze switch 21 is detected by a CPU 2. Namely, the image data is sequentially read out of the memories 5 to 7 and a luminance histogram as shown in FIG. 3 is obtained, thereby detecting the dynamic range. The histogram is stored into an RAM 1. In this case, since it takes a long time if all pixels in the memory 5 are scanned, it is possible to thin out the pixels and to scan the pixels, for example, every five pixels in accordance with the sampling (picture plane of the luminance Y) as shown in FIG. 9A. Since the image data of one picture plane must be scanned within 1/30 second, it is necessary to use the memories which can operate at a high speed as the ROM and memories which constitute the A/D converter, conversion table, and the like.

The dynamic range of the luminance is determined by a highlight point ($H_p$) and a dark point ($D_p$) in the histogram. It is defined that the highlight point ($H_p$) denotes the luminance of the point which is 1% away from the bright luminance portion and the dark point ($D_p$) represents the luminance of the point which is 1% away from the dark luminance portion.

Figure 4:
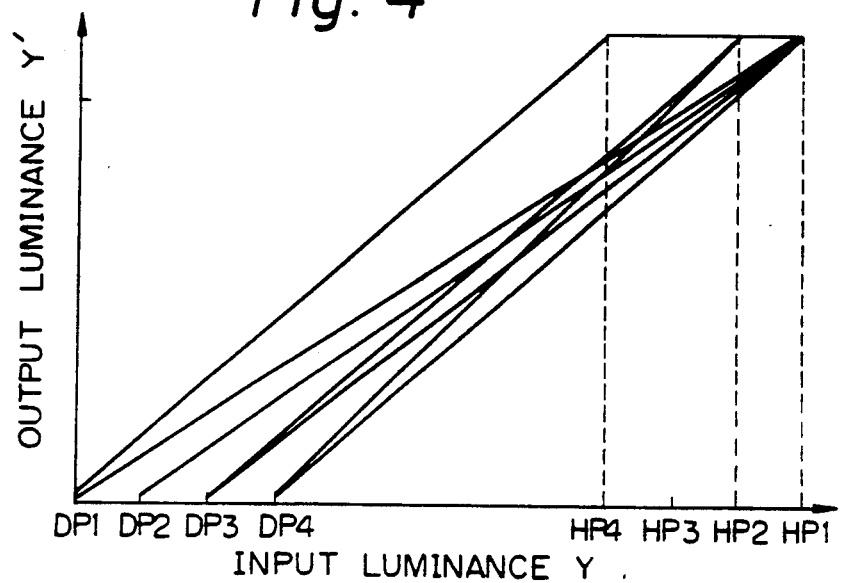
FIG. 4 is a characteristic diagram showing various conversion characteristics regarding the luminance signal.

In the luminance conversion table 9, it is possible to perform the conversion of a few kinds of gradation conversion characteristics as shown in FIG. 4. Either one of those conversion characteristics is selected in the following manner. Assuming that the highlight point ($H_p$) and dark point ($D_p$) in FIG. 3 have the values near $H_{p1}$ and $D_{p1}$ in FIG. 4, respectively, the conversion characteristic connecting $H_{p1}$ and $D_{p1}$ in FIG. 4 is the optimum conversion characteristic which does not lose the dynamic range of the input image. On the contrary, in the case of the characteristic connecting $H_{p4}$ and $D_{p1}$, the color reproducibility in the higher luminance portion will be lost. The luminance conversion table 9 having such a few kinds of characteristics in constituted by, e.g., an ROM or the like and the number of conversion tables can be increased or decreased in accordance with the capacity. It is sufficient to properly address the ROM on the basis of the values of the highlight point ($H_p$) and dark point ($D_p$) of the histogram.

FEATURE OF THE LUMINANCE CONVERSION

In this manner, the dynamic range in the direction of the luminance is properly compressed (what is called the normalizing process is performed) and the accurate output image which cannot be obtained by the conventional unitary log conversion is reproduced. Namely, the gradation correction suitable for the output ink is performed. On the other hand, since the luminance converted luminance signal Y' is compressed, if it is necessary to store the image signal into the frame memory or the like, the memory capacity can be saved by use of the luminance signal Y' after the luminance conversion rather than the luminance signal Y after the matrix operation 8. As explained above, the invention has such an excellent feature.

On the other hand, if only the luminance is compressed without compressing the dynamic range in the direction of the saturation, which will be explained hereinafter, the saturation C is preferably held and the good color reproduction is realized. Further, since the table conversion is used, an increase in circuit scale or the like can be prevented and the like.

In the foregoing embodiment, an explanation has been made with respect to the example of the video printer having the frame memory. However, if a line memory is used, the invention can be also embodied without the frame memory.

CONVERSION OF THE COLOR DIFFERENCE→SATURATION/HUE

Figure 5:
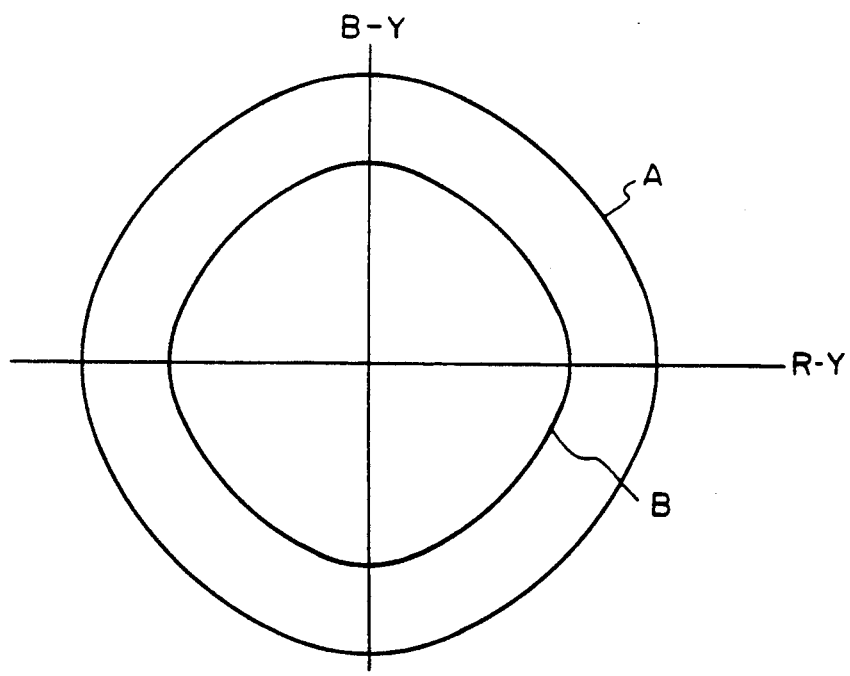
FIG. 5 is a diagram for explaining the differences of the dynamic ranges of the image signals of the RGB system and the Ye, M, and Cy systems.

As shown in FIG. 5, the dynamic range A in the direction of the saturation by the RGB input signals is fairly wider than the reproduction range B in the saturation direction by the ink of the Cy, M, and Ye signals, so that the input image signals need to be compressed in the saturation direction. For this purpose, in this embodiment, after the color difference signals R−Y and B−Y were converted into the saturation signal C and hue signal H by the color difference conversion table 10, the compression in the saturation direction is performed, thereby obtaining the saturation signal C' from the saturation signal C. First, the color difference signals are converted into the hue and saturation signals in accordance with the following equations.

$$H \text{ (hue)} = \text{ArcTan}\left(\frac{B-Y}{R-Y}\right)$$

where, when $R-Y=0$, $H=0$.

$$C \text{ (saturation)} = \sqrt{(R-Y)^2 + (B-Y)^2}$$

Figure 6:
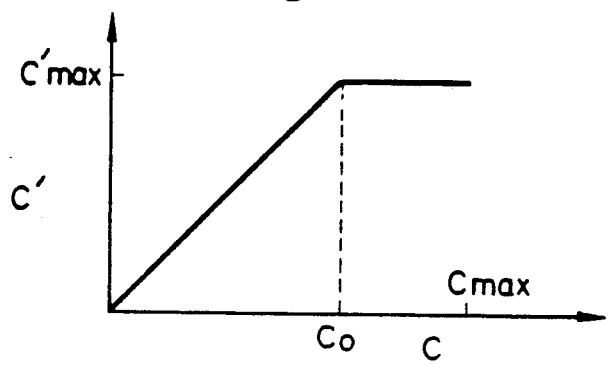
FIGS. 6 to 8 are characteristic diagrams showing the compression characteristics of the saturation.

The results of the above arithmetic operations in the combinations of the respective values of $R-Y$ and $B-Y$ are stored in the conversion table 10. However, as mentioned above, the dynamic range in the saturation direction by the RGB input signals is fairly wider than the reproduction range in the saturation direction by the inks of the Cy (cyan), M (magenta), and Ye (yellow) signals, so that even if the compression is performed, the color reproducibility in printing will not so largely deteriorate. The simplest compression characteristic is shown in FIG. 6. The portion of a high saturation is clipped on the basis of the fact that the ordinary images existing in the natural world are mostly concentrated in the portion of a low saturation. In the diagram, C' is obtained by further converting the following saturation C by the conversion table 10.

$$C \text{ (saturation)} = \sqrt{(R-Y)^2 + (B-Y)^2}$$

Figure 7:
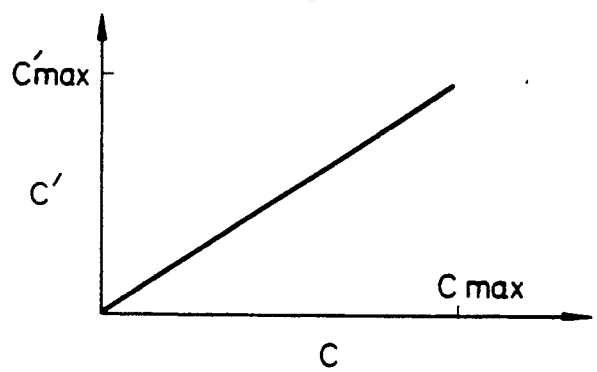
Figure 8:
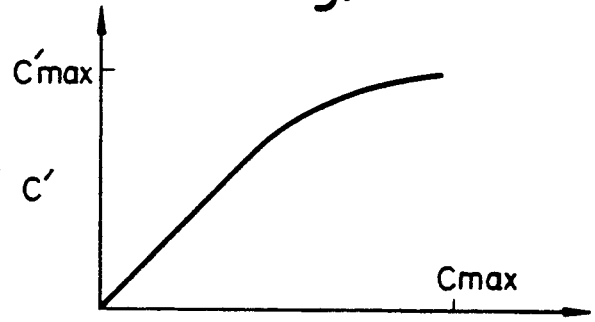

There occurs a problem such that after all of the input saturation signals C larger than the output saturation signal $C'_{max}$ were compressed to $C'_{max}$ by the above conversion, the difference of the saturation in this portion cannot be expressed. In this case, it is also considered to use such a conversion characteristic as shown in FIG. 7 in order to prevent such a problem. However, when this characteristic is used, the saturations of all pixels decrease and the good color reproduction cannot be derived. Therefore, it is considered to use a non-linear characteristic as shown in FIG. 8. With this characteristic, the saturations of most of the pixels do not decrease, namely, the saturation reproducibility is not lost. Moreover, the saturation signal C' can be formed without losing the difference of the saturation in the portion of the high saturation. This is because the ordinary natural images are concentrated in the region of a relatively low saturation.

NORMALIZATION OF THE SATURATION

Figure 9B:
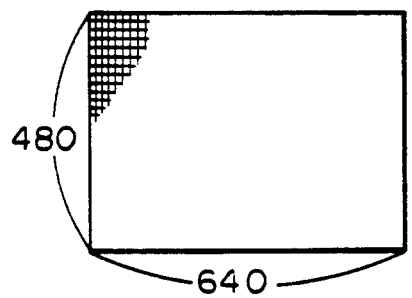
Figure 9C:
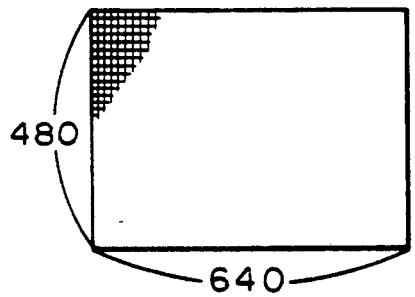
Figure 10A:
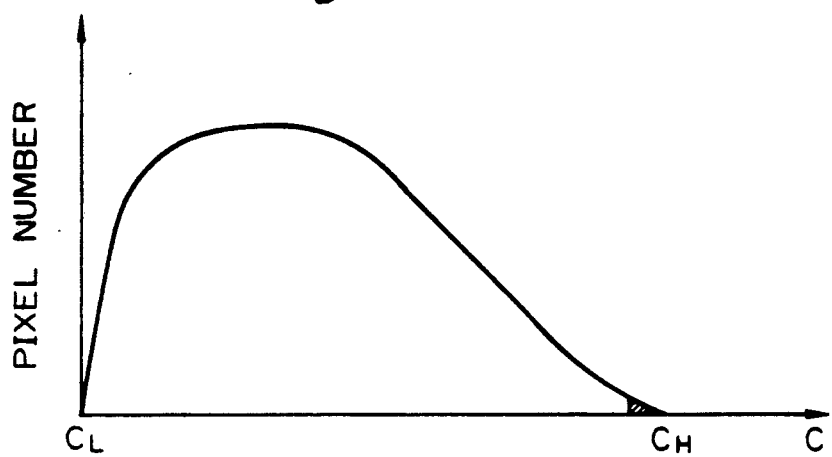
FIGS. 10A and 10B are diagrams for explaining the case where a histogram with respect to the saturation is obtained and the compression is performed.
Figure 10B:
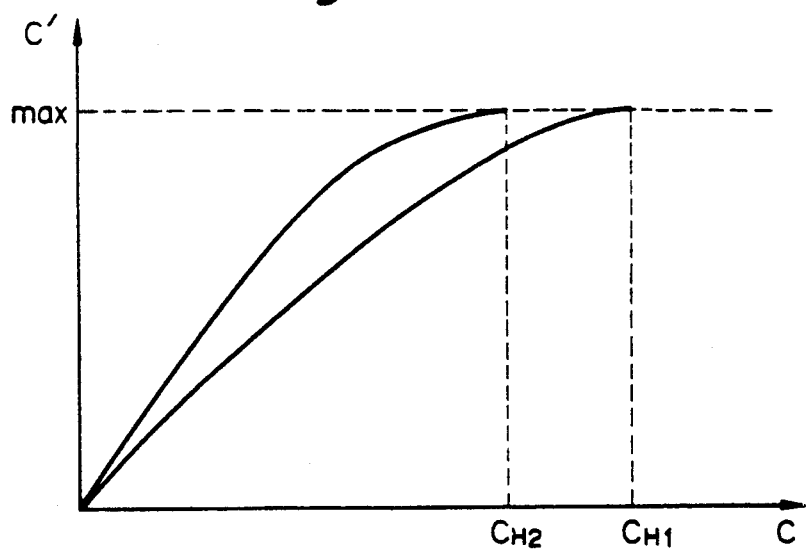

The normalization which has been mentioned in the luminance conversion may be also used for the compression of the saturation in order to compress to the more proper dynamic range. Namely, a histogram of the saturation is obtained from the memories 6 and 7. It is assumed that the histogram is as shown in, e.g., FIG. 10A. Assuming that the maximum saturation derived similarly to the case of the luminance compression is $C_H$ and the minimum saturation is $C_L$, the optimum compression/conversion characteristic is selected from a plurality of characteristics as shown in FIG. 10B on the basis of the values of those maximum and minimum saturations. In this way, the optimum color reproduction can be obtained. However, the selection of the proper conversion characteristic from the histogram is likely to cause the processing speed to be reduced; therefore, the high speed memory device or the like is needed. Examples of the sampling of the color difference signals to obtain the histograms at a high speed are shown in FIG. 9B (picture plane of the color difference $R-Y$) and FIG. 9C (picture plane of the color difference $B-Y$).

COLOR CORRECTION CONVERSION

The resultant Y', H, and C' signals are input to the color correction conversion table 11 and converted into Cy', M', and Ye' signals. The values which are stored into the conversion table are calculated fundamentally by the conversion opposite to the foregoing conversion in accordance with the following equations.

$$(R-Y)' = C' \times \cos H$$

$$(B-Y)' = C' \times \sin H$$

Further, $$R' = (R-Y)' + Y$$

$$G' = -\{0.3(R-Y)' + 0.11(B-Y)'\} + Y$$

$$B' = (B-Y)' + Y$$

Next, $$Cy = -\log R'$$

$$M = -\log G'$$

$$Ye = -\log B'$$

The following matrix approximation is performed to correct the uneven color components of the ink.

$$\begin{bmatrix} Cy' \\ M' \\ Ye' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Cy \\ M \\ Ye \end{bmatrix}$$

where, $a_{11}$ to $a_{33}$ are constants.

FEATURE OF THE SATURATION COMPRESSION

According to the foregoing embodiment, not only the difference between the saturations of the input and output is effectively compensated but also the maximum amount of the saturation signal is reduced. Therefore, even in the case of the same number of bits assigned, the fine digitization can be performed and the efficiency rises. Namely, the storing efficiency by the compression increases.

Although the example of the video printer has been described in the embodiment, the invention can be also applied to other systems regarding the correction of the color image as a constituting system in the printing and the like. On the other hand, in this embodiment, after the RGB signals were A/D converted, they are converted into the Y, $R-Y$, and $B-Y$ signals by the matrix operation. However, it is also possible to constitute in such a manner that after the RGB signals were matrix converted into the Y, $R-Y$, and $B-Y$ signals before the A/D conversion, then these signals are A/D converted into digital signals and these digital signals are used.

COLOR IMAGE MEMORY APPARATUS

The embodiment of FIG. 1 has not only a feature such that the color reproduction can be properly performed but also a feature such that the image signal can be compressed as mentioned above. Therefore, it will be understood that the problem in the conventional example is simultaneously solved; namely, "For example, when the number of bits in the depth direction of each of two color difference signals in six, a difference occurs between the original image and the reproduced color image.". In other words, even if the memory is saved, the saved amount is compensated by the compression and no problem occurs in the color reproduction because of the foregoing reason.

Figure 11:
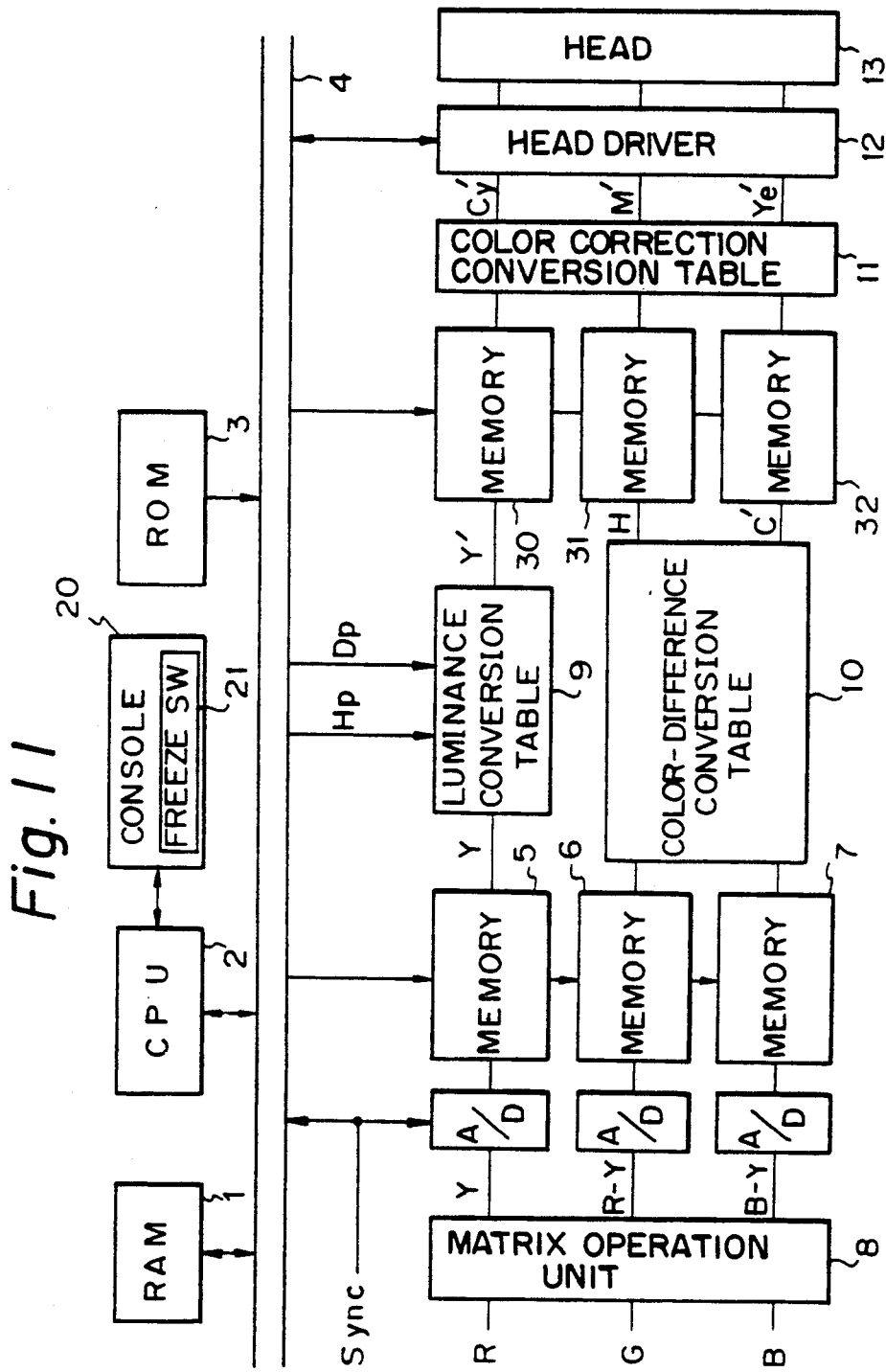
FIG. 11 is a block diagram showing another embodiment when considering the case where the memory area is reduced.

FIG. 11 shows an embodiment which is constituted from the viewpoint of the saving of the memory. A large difference from the embodiment of FIG. 1 relates to memories 30 to 32. The memories 30 to 32 are, for example, the frame memories (frame buffers) to output an image. Hitherto, it is a problem to reduce the memories in this portion as mentioned above. However, the memory can be saved by the compression of the luminance signal or saturation signal in this embodiment.

There are a few methods of compressing the luminance signal as mentioned above. However, since the memory 5 is essentially necessary to obtain the histogram, the memory 5 will be unnecessary if the characteristics as shown in, e.g., FIGS. 6 and 7 are fixedly used. Because of the similar reason, the memories 6 and 7 are also unnecessary when such a compression that the histogram of the saturation is unnecessary is performed.

Figure 12:
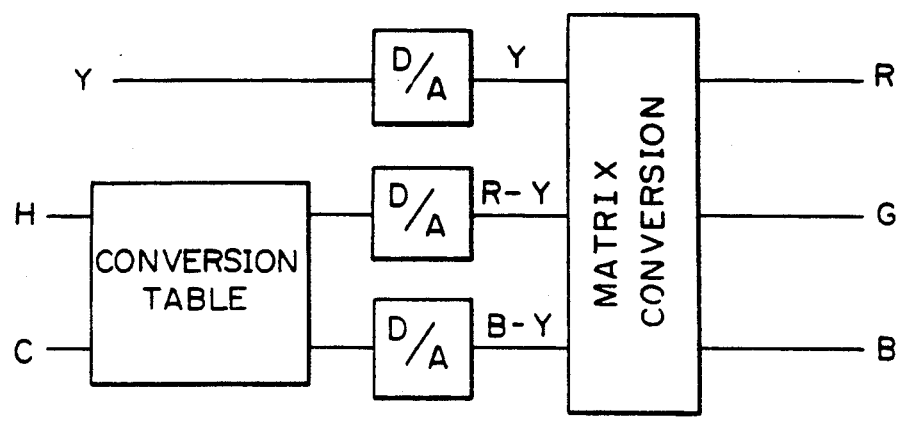
FIG. 12 is a circuit diagram showing an example of another constitution of a color correction conversion table.

In this embodiment, the number of pixels has been set to the standard number (640×480) of the NTSC system. However, the number of pixels can be also reduced. In particular, if the color correction conversion table 11 in FIG. 1 or 11 is constituted as shown in FIG. 12, the color data can be remarkably reduced.

As described above, according to the foregoing embodiment, by storing the image signals as the formats of luminance, hue, and saturation, the compression can be performed, so that the capacity of the memory section can be decreased without deteriorating the image quality.

In addition, since the conversion is performed in accordance with the dynamic range of the input color image signal, in particular, the luminance signal, even in the case of the input color image signal of any dynamic range, the good color reproduction can be derived.

EMBODIMENT OF THE CORRECTION OF THE SKIN COLOR

An explanation will now be made with respect to an embodiment such that in the color correcting process, when the hue is close to the hue of the stored color of a predetermined color, the hue is output as a value which is closer to the hue of the stored color of the predetermined color.

Figure 14:
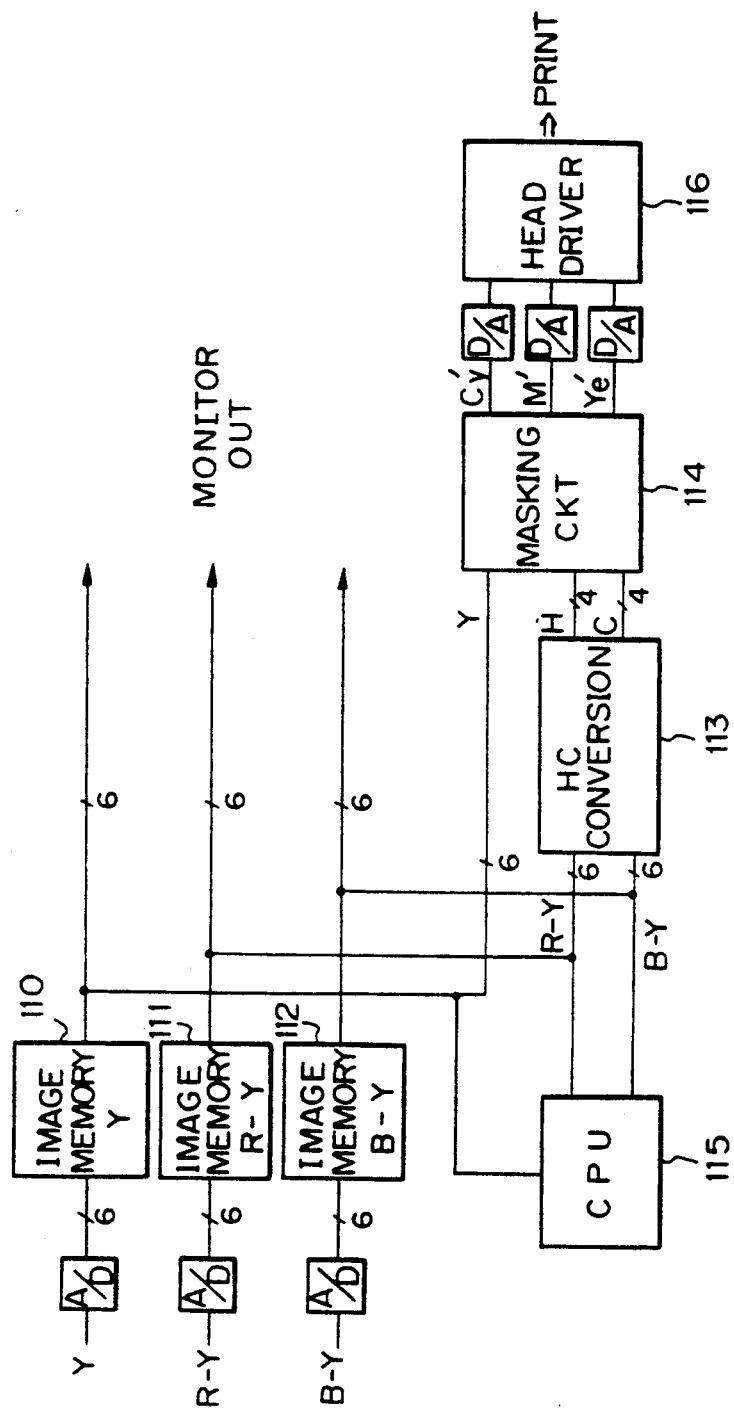
FIG. 14 is a block diagram showing an image processing apparatus of another embodiment.

FIG. 14 is a block diagram of a color video printer of the embodiment. This embodiment includes a masking circuit 114 which receives the color difference signals R−Y and B−Y and an HC conversion ROM 113 disposed at the front stage thereof as main components. As the outline of the whole operation, the input signals of Y, R−Y, and B−Y are A/D converted and stored into image memories (110, 111, 112). A CPU 115 takes out the Y, R−Y, and B−Y signals of the pixel to be printed from the image memories (110, 111, 112). The color difference signals R−Y and B−Y taken out are converted into the hue signal H and saturation signal C by the HC conversion ROM 113. Data such that the color difference signals R−Y and B−Y are used as address inputs and converted into the hue signal H and saturation signal C is stored in the HC conversion ROM 113. The Y, H, and C signals are transmitted through the masking circuit 114 and converted into the Cy' (cyan), M' (magenta), and Ye' (yellow) signals and further D/A converted and printed.

Figure 15:
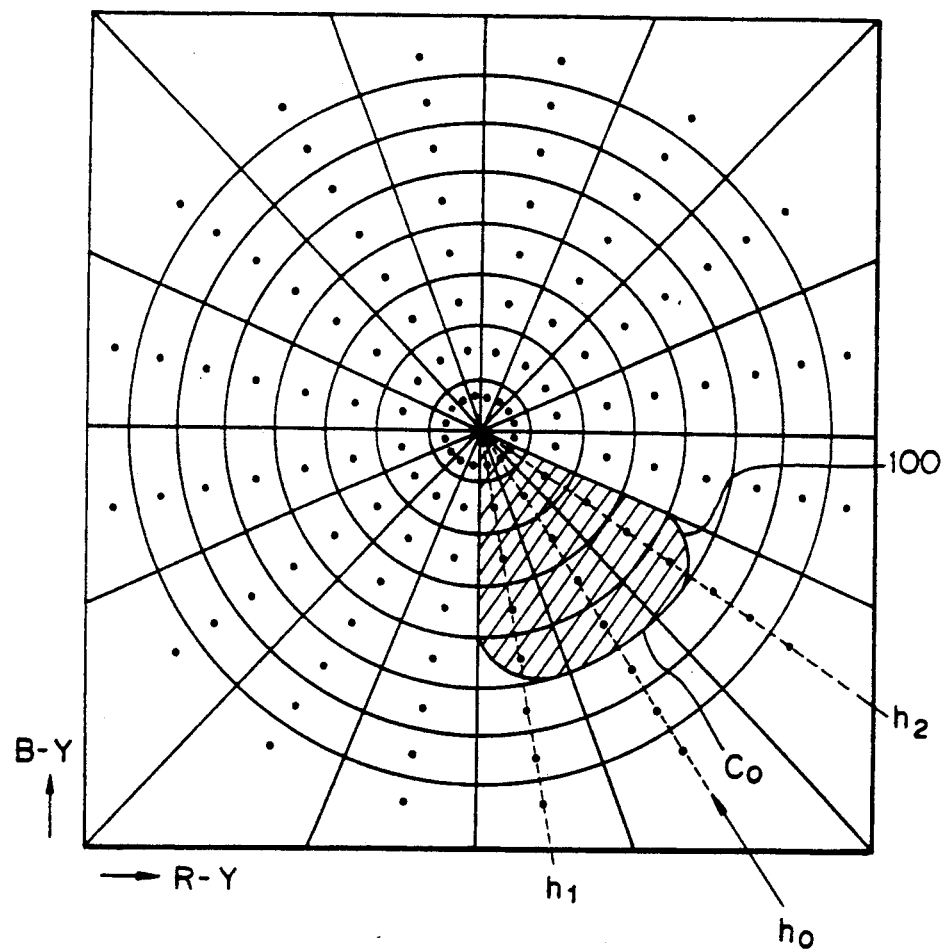
FIG. 15 is a diagram for explaining the digitization by an HC conversion ROM and a distribution of a skin color.

The HC conversion ROM 113 converts the color difference signals R−Y' and B−Y' into the luminance signal Y and saturation signal C. In this case, such a digitization as shown in FIG. 15 is executed when converting into the H (hue) and C (saturation) signals. Namely, the digitization is performed in a manner such that the plane of the R−Y and B−Y signals is divided into the regions surrounded by circles and straight lines and the values in the regions are represented by points ".". In this case, $$H \text{ (hue)} = \text{ArcTan}\left(\frac{B-Y}{R-Y}\right)$$

where, when, $R-Y=0$, $H=0$, $$C \text{ (saturation)} = \sqrt{(R-Y)^2 + (B-Y)^2}$$

The amplitude from a reference axis corresponds to the hue H and the radius of circle corresponds to the saturation C. In FIG. 15, H of the output shows the case of four bits and C shows the case of three bits. The hatched portion 100 shows the region in which the colors near the skin color are distributed.

In the diagram, $h_0$ denotes a hue of the preferable skin color of the stored color, and $h_1$ and $h_2$ represent ranges of the hues which ought to be sensed as the skin color by the digitization of FIG. 15. The digitization as shown in FIG. 15 is nothing but the process such that the values of hue (H) are taken every equal angle and the values of saturation (C) are taken at regular intervals and these values are set representative values. Therefore, no consideration is made to the visual sensation of the human being in the case of such a digitization.

Figure 16:
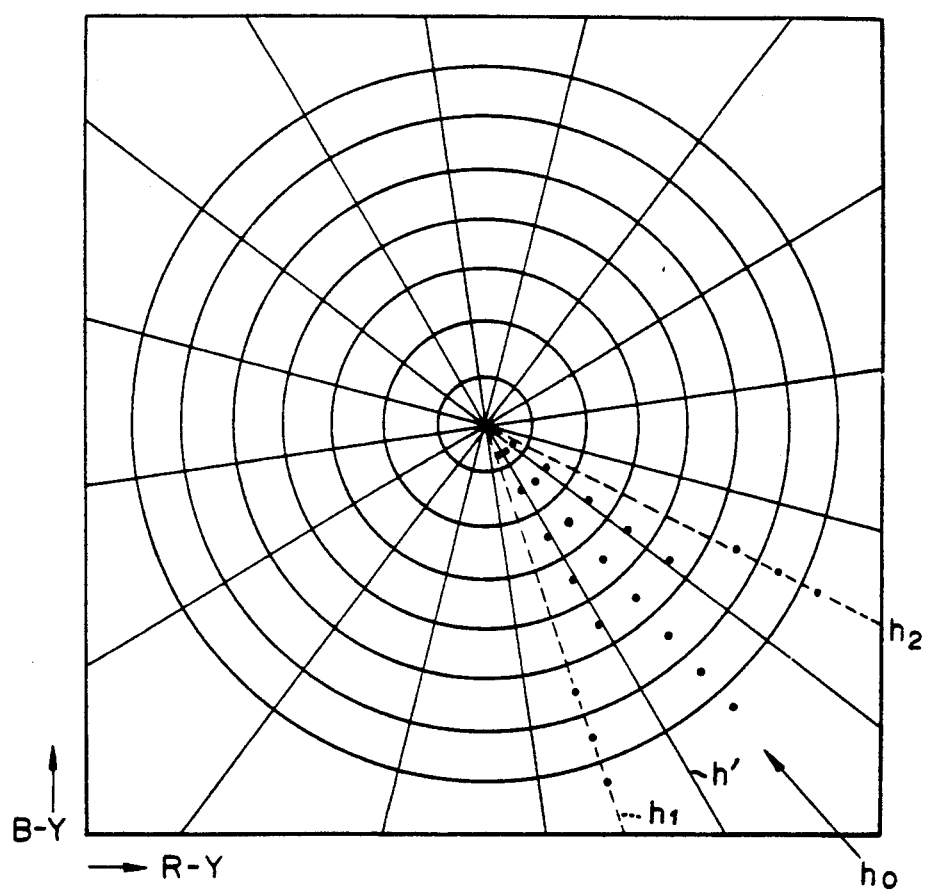
FIG. 16 is a diagram for explaining the correction to approach the hue of the image signal in the skin-colored region to the memory color as close as possible.
Figure 17:
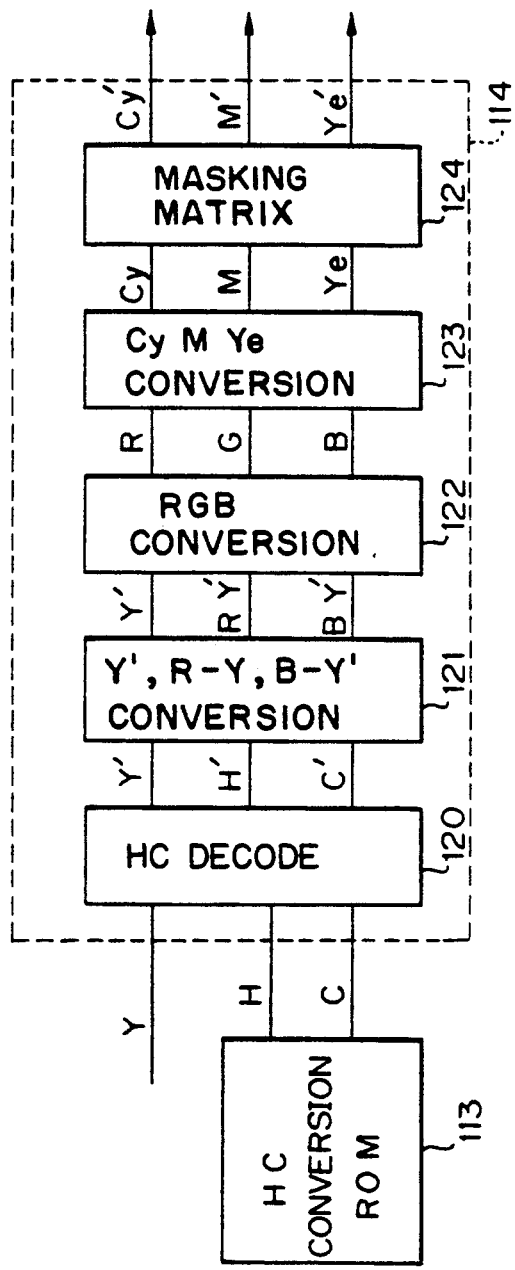
FIG. 17 is a detailed diagram of a masking circuit of an embodiment.

The skin color to which the human being pays the largest attention is reproduced by use of the masking circuit 114 having such a constitution as shown in FIG. 17. The masking circuit 114 comprises: an HC decoder 120 for converting the H and C signals to the corrected H' and C' signals as shown in FIG. 16; a converter 121 to reversely convert the Y', H', and C' signals into the Y', R−Y', and B−Y' signals; an RGB converter 122 to further convert the Y', R−Y', and B−Y' signals into the R, G, and B signals; a converter 123 to convert the R, G, and B signals into the Cy (cyan), M (magenta), and Ye (yellow) signals; a masking matrix circuit 124 to perform the ordinary masking processes; and the like.

The HC decoder 120 will be first described. When it is assumed that the HC conversion ROM 113 outputs the H signal of h bits and the C signal of k bits, the hue and saturation to the region other than the skin-colored region 100 are $$360° \times (h/2^n)$$

and $$C_{max} \times C/(2^k - 1)$$

where, $C_{max}$ denotes the maximum saturation. The HC decoder 120 does not perform any process in such a region 100.

On the other hand, assuming that the HC conversion ROM 113 generated the image signals included in the skin-colored region 100 to the HC decoder 120 (as the signals of h bits and k bits), the HC decoder 120 outputs the hue signal as h' which is closer to $h_0$ as shown in FIG. 16 when lines between $h_1$ and $h_2$. Further, when also considering the saturation in the skin-colored region 100, only the output of the HC conversion ROM 113 in the range where h falls between $h_1$ and $h_2$ and $2^k \leq C_0$ is corrected. The HC decoder 120 to convert the input as shown in FIG. 15 into the output as shown in FIG. 16 can be easily constituted as an ROM.

In this manner, by setting the hue of the image signal which is considered to be the skin color into the value near the hue of "the preferable skin color", the skin-colored region which is generally distributed can be collected to the region of "the preferable skin color" and the reproducibility of the skin color can be improved.

The resultant Y, H, and C signals are input to the converter 121 and converted in the following manner.

$$(R-Y)' = C \times \cos H$$

$$(B-Y)' = C \times \sin H$$

Further, the following R, G, and B signals are output from the RGB converter 122.

$$R = (R-Y)' + Y$$

$$G = -\{0.3(R-Y)' + 0.11(B-Y)'\} + Y$$

$$B = (B-Y)' + Y$$

The following conversion is performed by the converter 123.

$$Cy = -\log R'$$

$$M = -\log G'$$

$$Ye = -\log B'$$

Then, the following matrix conversion is performed by the masking matrix circuit 124 to correct the uneven color components of the ink.

$$\begin{bmatrix} Cy' \\ M' \\ Ye' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Cy \\ M \\ Ye \end{bmatrix}$$

where, $a_{11}$ to $a_{33}$ are constants.

The HC conversion ROM 113 and HC decoder 120 can be also constituted by one ROM. Although the foregoing embodiment has been described with respect to the video printer, in the case of outputting to a CRT device or the like, a more preferable skin color can be reproduced if the output of the RGB converter 122 is displayed by the CRT. Although the embodiment has been described with regard to the skin color, the invention can be also applied to other color, e.g., sky color or the like.

As described above, according to the embodiment, by approaching the hue in a predetermined range in the image signals to the hue of a desired stored color, the color which the human being can feel preferable can be reproduced. In particular, the skin color can be effectively reproduced.

DIGITIZATION

A non-linear digitizing method of the color image signals will now be described.

Figure 18:
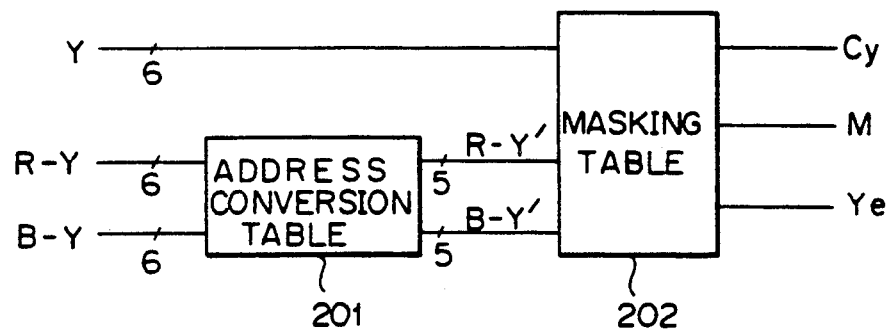
FIG. 18 is a conceptional diagram of the image process according to an embodiment.
Figure 13:
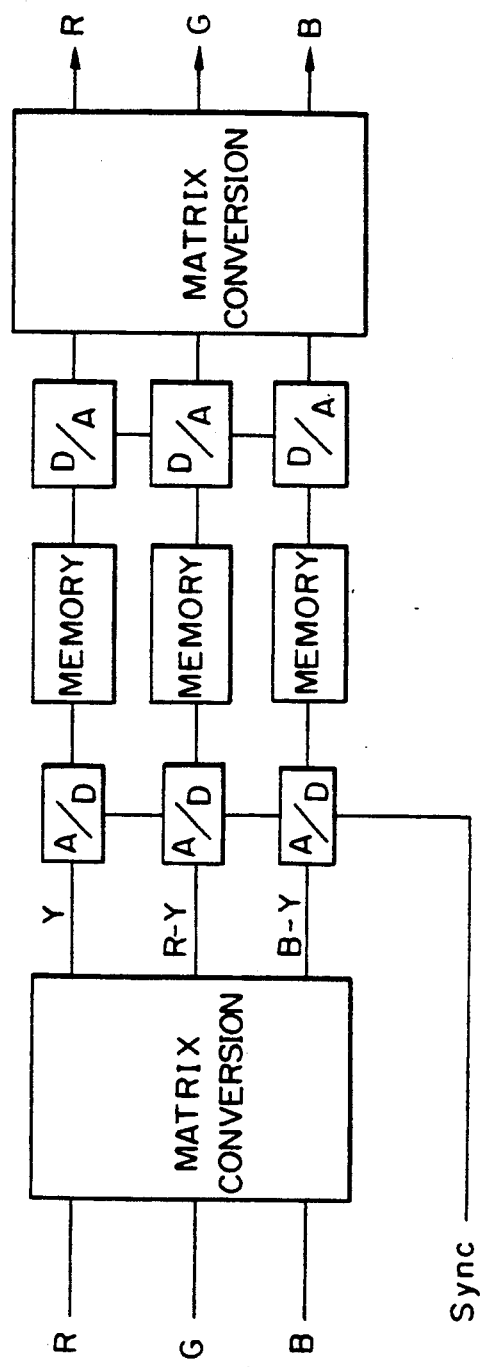
FIG. 13 is a block diagram showing a conventional constitution.

FIG. 18 is a diagram showing a fundamental constitutional concept of an embodiment in which the luminance signal Y and color difference signals R−Y and B−Y are input as color image signals and masking processed. When the luminance signal Y and color difference signals R−Y and B−Y are used as the color image signals, the luminance Y is unnecessary for the saturation. Therefore, the luminance signal Y is not input to an address conversion table 201. The address conversion table 201 consists of, e.g., an ROM or the like and the color difference signals are input as addresses in the ROM. Such a data that the portion of a low saturation was finely digitized and the portion of a high saturation was roughly digitized is previously stored in the ROM. The ROM has the functions to perform the digitization and the conversion of the address space. The address conversion table 201 outputs the color image signals R−Y' and B−Y' which are the converted addresses and whose values were changed. In this case, even when the signals each consisting of six bits are input to the address conversion table 201 and the signals each consisting of five bits are output therefrom, the digitization is not simply performed at regular intervals as in the conventional apparatus. Therefore, the accuracy does not simply deteriorate to ¼.

FIG. 19 is a block diagram of a color video printer to which the invention is applied. This printer comprises: a masking ROM 214 which receives the Y, R−Y, and B−Y signals; and an address conversion ROM 213 arranged at the front stage thereof. As the outline of the whole operation, the Y, R−Y, and B−Y input signals are A/D converted and stored into image memories (210, 211, 212). A CPU 215 reads out the Y, R−Y, and B−Y signals of the pixel to be printed from the image memories 210 to 212. The R−Y and B−Y signals are transmitted through the address conversion ROM 213 and digitized into the signals each consisting of less bits. Next, the Y, R−Y, and B−Y signals are transmitted through the masking ROM 214 and converted into the Cy (cyan), M (magenta), and Ye (yellow) signals and further D/A converted and printed.

Figure 21A:
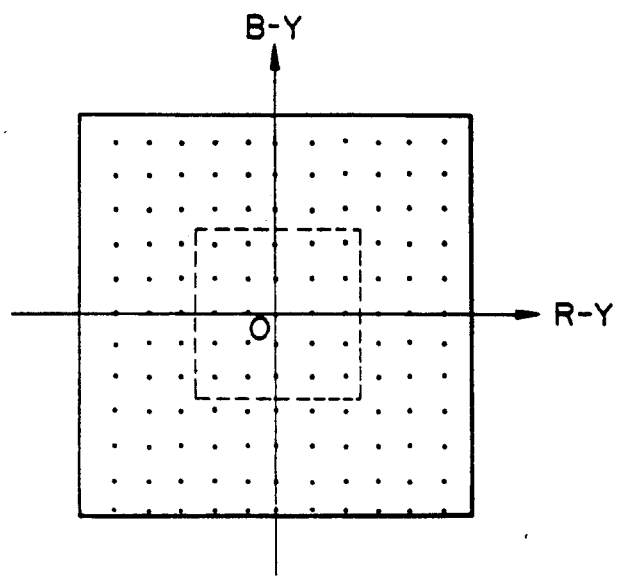
FIG. 21A is a diagram of a digitization space when simply digitizing at regular interval.

When the digitization is performed at regular intervals as in the conventional apparatus, the content of the address conversion ROM 213 (or address conversion table 201) is as shown in FIG. 21A. The digitization (i.e., the address conversion) of the (color difference) image signals denotes that the plane which is expressed by R−Y and B−Y is represented by points ".". At this time, the cross point of the R−Y and B−Y axes has the saturation 0 and the saturation increases as the point is extended to the outside from this point.

Figure 20:
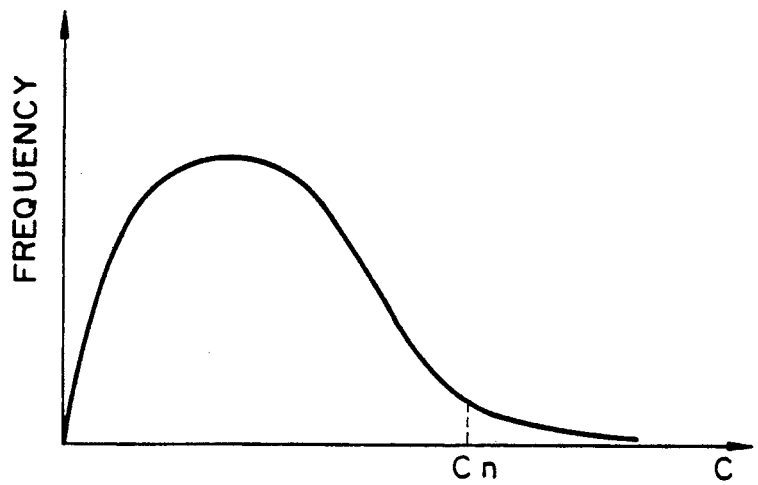
FIG. 20 is a frequency diagram of the pixels to the saturation of the natural image.
Figure 21B:
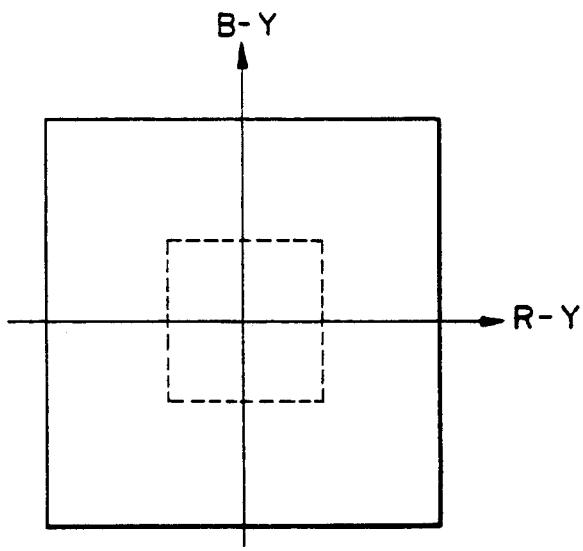
FIG. 21B is a diagram showing a space of an ROM corresponding to the digitization of FIG. 21A.

FIG. 20 shows a histogram of the saturations of the pixels of the color image which ordinarily exists in the natural world. In such a natural image, the number of pixels having the saturations above a certain saturation value ($C_n$) rapidly decreases. Therefore, in the case of the digitization space of regular intervals shown in FIG. 21A, only the space of the masking ROM shown in FIG. 21B is obtained. In the ROM space of FIG. 21B, the portions of the saturations above the saturation value $C_n$ relatively become vain as mentioned before.

Figure 22A:
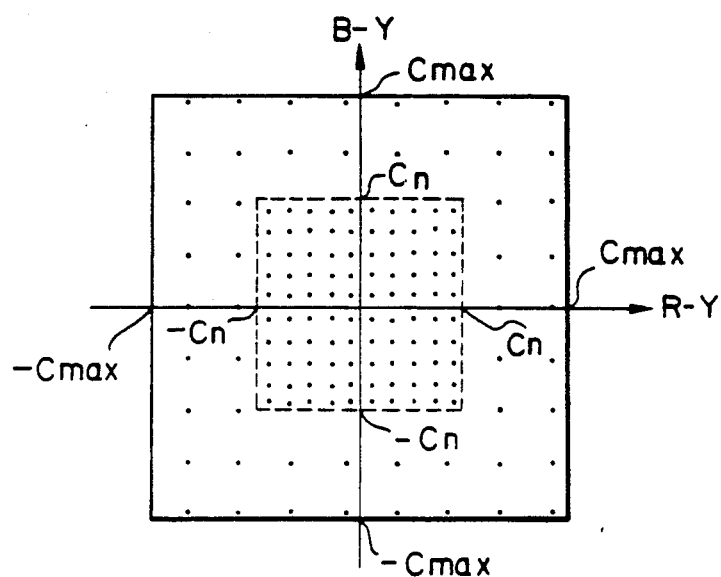
FIG. 22A is a diagram of a digitization space according to an embodiment.
Figure 22B:
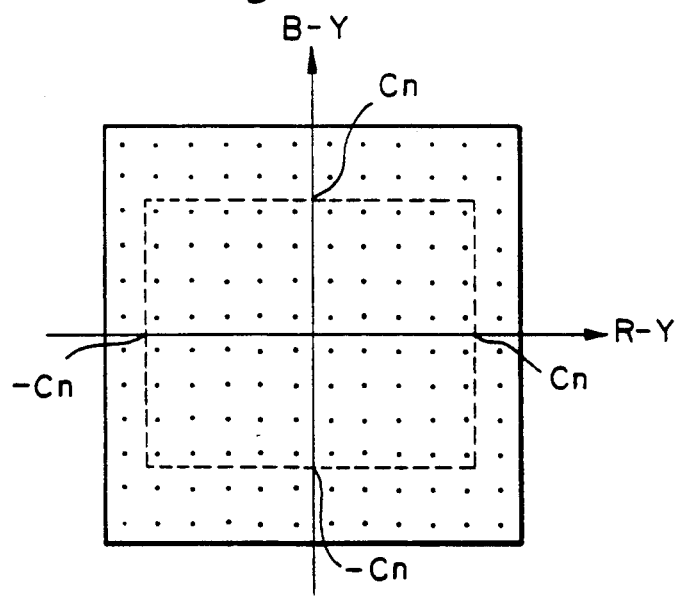
FIG. 22B is a diagram showing an ROM space corresponding to the digitization of FIG. 22A.

A method according to the embodiment is shown in FIGS. 22A and 22B. It is the fundamental concept of the digitization of the embodiment that the pixel distribution according to the saturation is plotted in the color difference (R−Y, B−Y) space, and the digitization interval is changed at a long interval of a few stages in accordance with the distribution density. FIG. 22A shows a digitization space corresponding to FIG. 21A in the embodiment. The digitization interval is set to two stages using the saturation value $C_n$ as a reference. The portion of a low saturation is digitized at a short interval. The region of a high saturation is digitized at a long interval. FIG. 22B shows an ROM space in the address conversion ROM 213. The sampling point in FIG. 22A corresponds to the sampling point in FIG. 22B in a one-to-one corresponding manner. Thus, as shown in FIG. 22B, the area in the portion surrounded by $C_n$ and $−C_n$ is widened as compared with that in FIG. 21A. The fine masking process is performed to the image signal of a low saturation and the color reproducibility is improved by only the amount of increased area. The reason why the intervals in FIG. 22B are equal is because, in general, the addresses must be input into the ROM at regular intervals.

The address conversion ROM 213 will be further described with reference to FIG. 22A. In the diagram, the region obtained when the maximum saturations of R−Y and B−Y were set to $C_{max}$ is shown by a straight line. The region of the saturation $C_n$ which is half of $C_{max}$ is indicated by a broken line. Assuming that the number of bits of each of the outputs R−Y and B−Y of the address conversion ROM 213 is n, the number of sample points to be digitized is m ($=2^n \times 2^n$). When it is assumed that K points among the m points are contained in the region of a low saturation in the area surrounded by the broken line, the number of sampling points to be included in one side of the area in the broken line is $\sqrt{K}$. Therefore, when the region between $−C_n$ and $+C_n$ is divided by $\sqrt{K}$ at regular intervals, it is sufficient to assign the intervals in the vertical and horizontal directions at every other $2 \cdot C_n/\sqrt{K}$. In the region other than the area in the broken line, the number of sample points is $n^2 − K$ and the area is $3 \cdot C_{max}^2$. Therefore, it is sufficient to arrange in both of the vertical and horizontal directions at every other $\sqrt{3} \cdot C_{max}/\sqrt{m-k}$.

Figure 23:
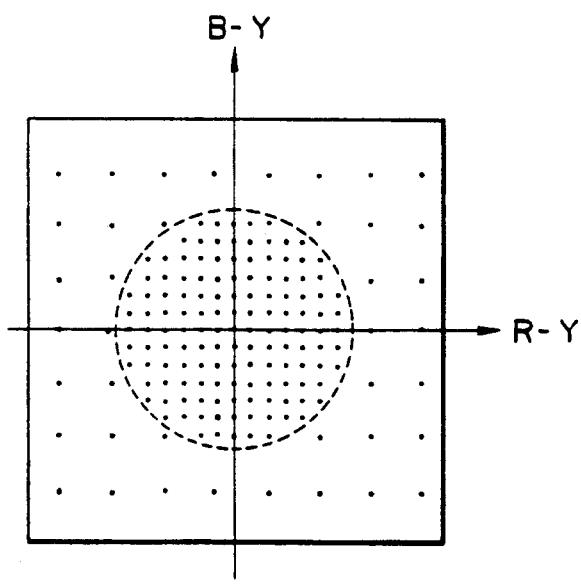
FIG. 23 is a diagram showing a digitization space when the digitization is radially performed from an origin.

Although the digitization in the square region has been performed in FIG. 22A, in the case of the saturation, there is also considered a method whereby the region of a low saturation is set to a circle and a larger number of bits are assigned to this circular region as compared with that in the other regions as shown in FIG. 23 by paying an attention to the fact that the saturation increases like a circle from the cross point of the R−Y and B−Y axes.

As described above, the address conversion ROM which receives the Y, R−Y, and B−Y signals is arranged at the front stage of the masking ROM, and a larger number of bits are assigned to the region of a low saturation, so that the natural image can be extremely efficiently digitized.

Although the masking process has been described as an example in the foregoing embodiment, the color correcting process is not limited to the masking process. The input color image signals are not limited to the luminance signal and color difference signals but may be the signals of the RGB system or other color expression system. When the distribution of the pixels is complicated, the number of digitization stages is not limited to two but may be set to a few stages. In this case, the fine color reproduction can be realized with less memory capacity.

As described above, according to the embodiment, an attention is paid to the deviation of the pixel distribution to the saturations of the input image signals, the fine color correcting process is performed to the image of a low saturation consisting of a large number of pixels, and the rough color correcting process is executed to the image of a high saturation consisting of less number of pixels. Therefore, the memory capacity of the color correction processing table can be efficiently used.

CORRECTION OF THE COLOR BALANCE

An embodiment in which the color balance is automatically corrected will now be described.

The correction of the color balance in this embodiment is performed by paying an attention to the highlight point (the pixel of the highest luminance) in the image. Namely, in the case of the image whose colors were well balanced, the probability such that the color difference of the highlight point is "0", namely, "white" is high. Therefore, the color balance correction in the color image processing apparatus in this embodiment will be summarized as follows.

(1) Since the color difference amount of the highlight point pixels in the image obtained is considered to be the "deviation" of the color balance, this color difference amount is set to the value $\Delta E$ to correct the color balance.

(2) With respect to all pixels, the $\Delta E \times$ luminance/maximum luminance is subtracted from the color difference amount of each pixel and the resultant difference is used as the color image signal after the correction, thereby adjusting the color balance.

Figure 25A:
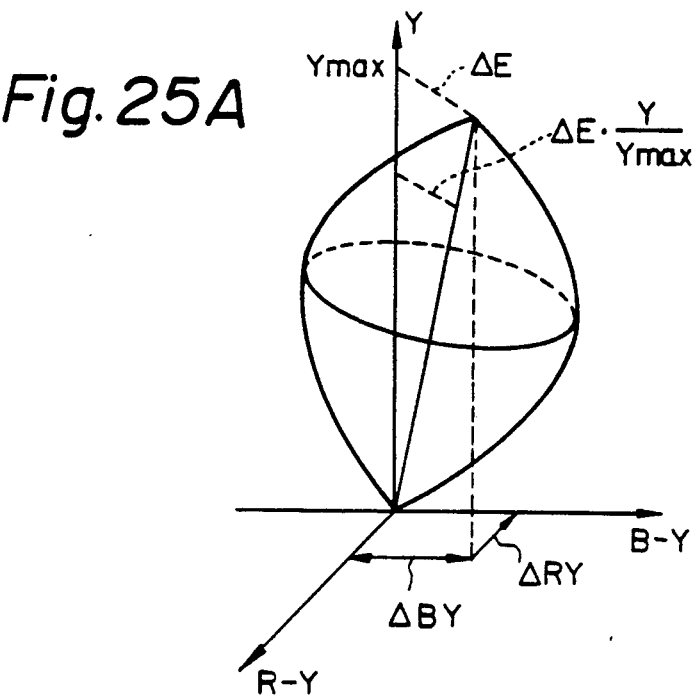
FIG. 25A and 25B are color stereograms before and after the correction for explaining the principle of the color balance correction in the embodiment.
Figure 25B:
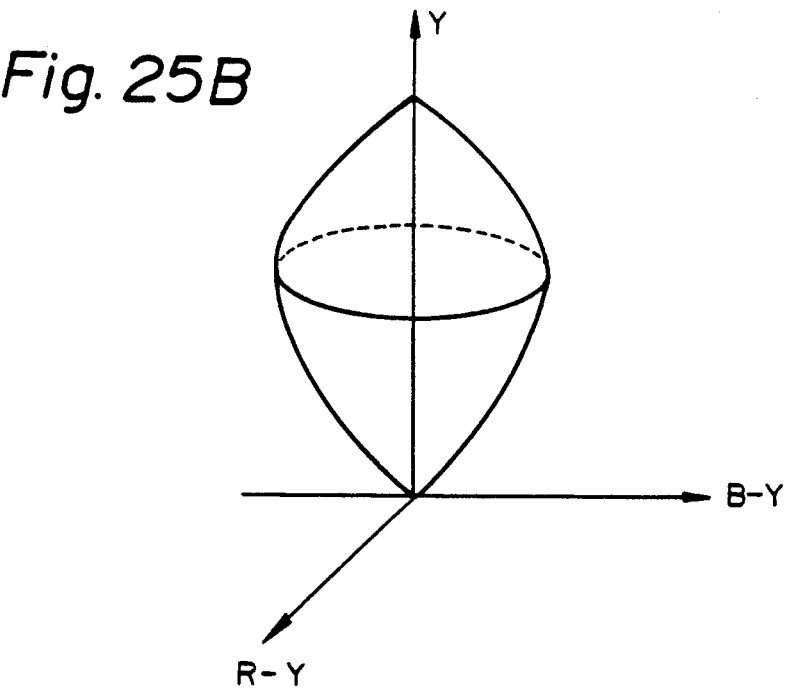

FIG. 25A shows a color stereogram of the image whose color balance is deviated. FIG. 25B shows a color stereogram of the image after the color balance was corrected. The color differences (R−Y, B−Y) of the pixel having the maximum luminance (Y) are considered to represent the "deviation" of the color balance. Therefore, when the color correction is performed by regarding the color difference amounts as the correction amounts $\Delta E$ ($\Delta R_y$, $\Delta B_y$), the corrected image as shown in FIG. 25B is obtained. When the correction amounts are calculated, the correction amounts corresponding to the color differences of an arbitrary pixel in the image are set to the values such that $\Delta E$ was proportionally distributed by the luminance/maximum luminance ($Y/Y_{max}$) as shown in FIG. 25A. In the following embodiment, two examples of the method detecting $\Delta E$ ($\Delta R_Y$, $\Delta B_Y$) will be explained.

OUTLINE OF THE APPARATUS IN THE EMBODIMENT

Figure 24:
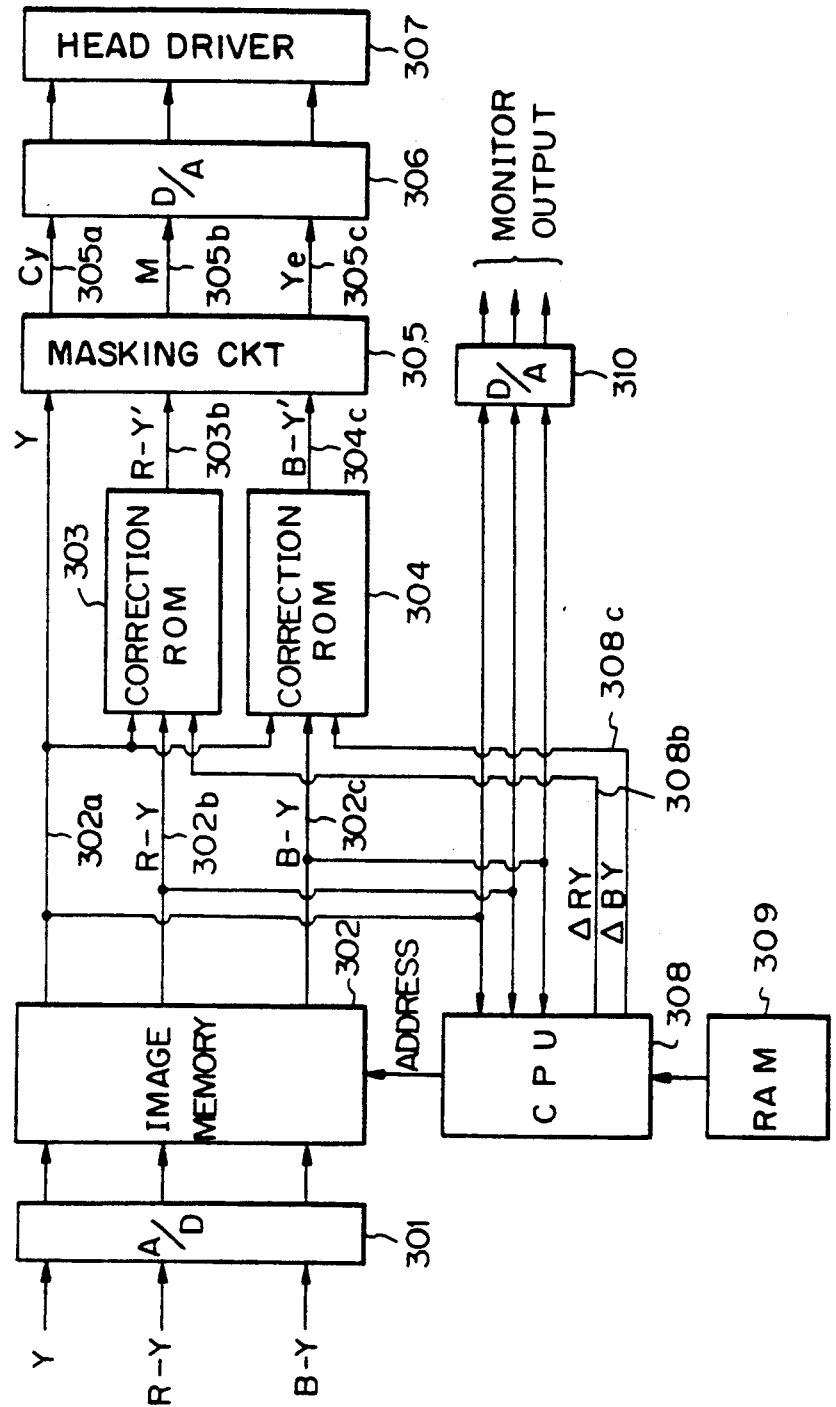
FIG. 24 is a block diagram showing a color image processing apparatus of an embodiment according to the invention.

FIG. 24 is a block diagram of a color image processing apparatus in the embodiment. The outline of the image processing apparatus shown in FIG. 24 is as follows.

The A/D converted color image signal Y and color difference signals R−Y and B−Y are stored in an image memory 302. A CPU 308 reads out the data from the image memory 302 and detects the correction amounts ΔE by either the method shown on FIG. 26 or the method shown in FIGS. 27A and 27B. The correction amounts (ΔR$_Y$, ΔB$_Y$) are respectively input to correction ROMs 303 and 304. The luminance signal Y and color difference signals R−Y and B−Y are also input to the correction ROMs 303 and 304, respectively. The outputs of the ROMs 303 and 304 and the luminance signal Y are input to a masking circuit 305 and converted into the Cy, M, and Ye signals. Then, these signals, are D/A converted and printed by a head driver 307. The correction of the color balance by the correction ROM is shown in FIG. 24 and will be explained in detail hereinafter. An explanation will be also made hereinafter with respect to an embodiment such that the correction of the color balance to each of the pixels constituting the image is executed by the CPU 308 in a software manner. The program for a procedure as shown in FIG. 26 and the like is stored in an RAM 309.

DETERMINATION OF ΔE

Figure 26:
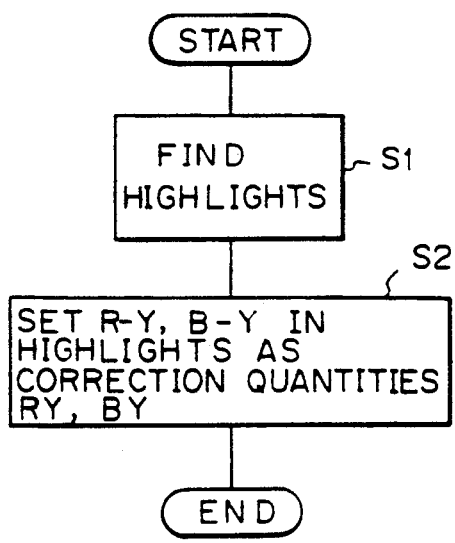
FIG. 26 is a flowchart according to a control procedure for detecting the correction amount from the pixel of the maximum luminance.

In the method of determining ΔE shown in FIG. 26, the color difference signals of the pixel having the maximum luminance (Y$_{max}$) are set to ΔE. First, in step S1, the pixels of the highlight points are found out by comparing the luminance Y of each pixel in the image memory In step S2, the color difference amounts R−Y and B−Y of the pixels are regarded as the "deviation" of the color balance and set to the correction amounts ΔE (ΔR$_Y$, ΔB$_Y$).

Figure 27A:
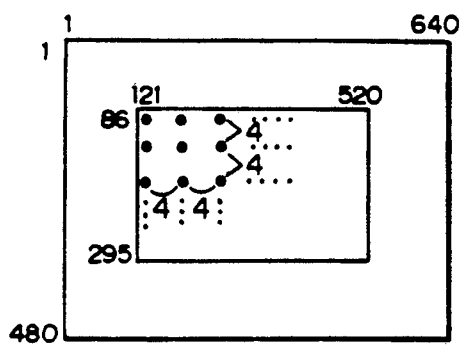
FIG. 27A is a diagram for explaining another embodiment to detect the correction amount.
Figure 27B:
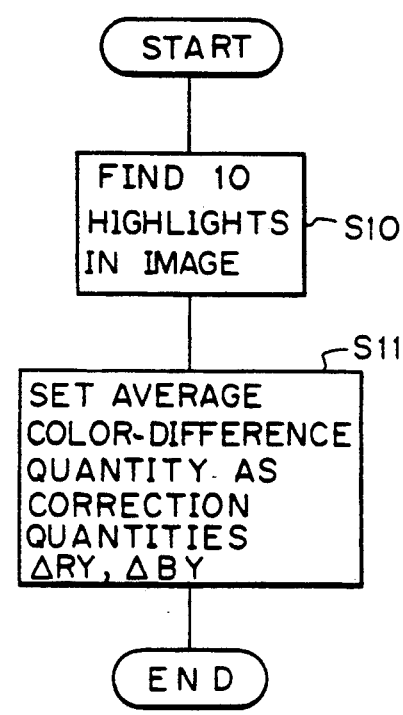
FIG. 27B is a flowchart according to a control procedure of the embodiment of FIG. 27A.

FIG. 27A shows the concept of another method of obtaining ΔE. FIG. 27B shows a procedure for this method. According to the foregoing method of obtaining ΔE, ΔE are obtained from one point of the maximum luminance. Therefore, there is a fear such that the correction amount becomes unstable. To prevent this problem, about ten sample points of the pixels having the highest luminance are collected and the average of the color difference amounts of these pixels is calculated to obtain the correction amounts, thereby stably and effectively correcting the color balance.

FIG. 27B is a flowchart for the process to determine the correction amount ΔR$_Y$ and ΔB$_Y$. First, ten highlight points are searched from the image in step S10. However, in this case, it takes a long time to search ten highlight points from all of the pixels. Therefore, as shown in FIG. 27A, when the input image consists of 640×480 pixels, the pixels are sampled every other four pixels in the vertical and horizontal directions in the region of (121 to 520)×(86 to 295) inside of this image and ten highlight points are searched. Even by such a thin-out sampling, almost the same result as that in the case of searching them from all of the pixels can be also derived.

When the color difference amounts R−Y and B−Y of ten highlight points are (R−Y)$_1$, (R−Y)$_2$, . . . , (R−Y)$_{10}$ and (B−Y)$_1$, (B−Y)$_2$, . . . , (B−Y)$_{10}$, ΔE (ΔR$_Y$, ΔB$_Y$), become $$\Delta R_Y = \{(R-Y)_1 + (R-Y)_2 + \ldots + (R-Y)_{10}\}/10$$

$$\Delta B_Y = \{(B-Y)_1 + (B-Y)_2 + \ldots + (B-Y)_{10}\}/10$$

Thus, the more effective correction amounts can be obtained as compared with the case of deciding the correction amounts from one highlight point.

CORRECTION OF THE COLOR BALANCE

The maximum correction amounts are derived in this manner. An embodiment in the case where the CPU 308 performs the correction of the color balance in a software manner will now be explained. In the correction of the color balance, the correction amounts ΔR$_Y$ and ΔB$_Y$ are used as the maximum values and the color balance is variably corrected in proportion to the luminance of each component pixel of the image. This is because if the correction amounts ΔR$_Y$ and ΔB$_Y$ are merely subtracted from the color difference R−Y and B−Y of each component pixel of the image, the correction is performed too much as the luminance of the pixel becomes low. Therefore, less correction amounts are subtracted for the pixels having a low luminance with regard to all of the pixels as explained in FIG. 25A by performing the following correction.

$$R-Y' \leftarrow (R-Y) - \Delta R_Y \times Y/Y_{max}$$

$$B-Y' \leftarrow (B-Y) - \Delta B_Y \times Y/Y_{max}$$

Figure 28:
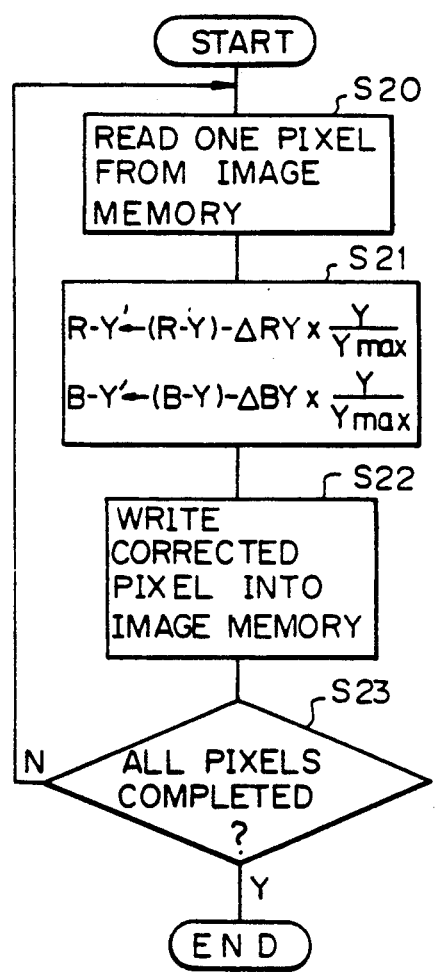
FIG. 28 is a flowchart for a control procedure in the case where the color balance correction is performed in a software manner.

Y, R−Y, and B−Y denote the image signals of each of the pixels constituting the image. Y$_{max}$ denotes the maximum luminance. FIG. 28 shows a procedure for the correction of the color balance. By the foregoing method, the image whose color balance was deviated in the image memory as shown in FIG. 25A is corrected as shown in FIG. 25B.

As described above, the resultant data obtained by multiplying the correction amounts obtained from the highlight points with the luminance/maximum luminance is subtracted from the color difference amounts of each component pixel of the image, so that the color balance can be effectively corrected at a high speed by the simple calculations. The color balance correction amounts linearly change in accordance with the luminance in the foregoing embodiment. However, the invention may be also applied to non-linear correction amounts by applying the weights corresponding to the luminances.

COLOR BALANCE CORRECTION TABLE

The correction ROMs 303 and 304 constituting the correction table for the correction of the color balance will now be explained. These ROMs intend to realize the high-speed process by executing the operations in step S21 in FIG. 28 in a hardware manner in place of the CPU 308.

As shown in FIG. 24, with respect to R−Y, the Y signal, R−Y signal, and signal of the correction amount ΔR$_Y$ are input to the ROM, so that the corrected R−Y' signal is output. Similarly, the B−Y' signal is output with respect to the B−Y signal. The correction amount ΔR$_Y$ and ΔB$_Y$ are previously calculated on the basis of the following equations and stored.

$$R-Y' \leftarrow (R-Y) - \Delta R_Y \times Y/Y_{max}$$

$$B-Y' \leftarrow (B-Y) - \Delta B_Y \times Y/Y_{max}$$

The processes can be performed at a high speed by executing the table conversion in this manner. FIG. 24 shows a block diagram of the color video printer using the table conversion. For example, with respect to R−Y, only the R−Y signal, $\Delta R_Y$ signal, and Y signal are input to the ROMs 303 and 304 shown in FIG. 24. The $Y_{max}$ signal is not input. This is because the value of $Y_{max}$ is fixed in order to reduce the number of input bits to the ROMs. For example, when the luminance Y consists of eight bits, the value of $Y_{max}$ is fixed to, e.g., "255". The values obtained by performing the foregoing equations using $Y_{max}=255$ are stored into the ROMs. The correction accuracy does not deteriorate even by this method and, accordingly, the scale of each ROM can be reduced by only the amount corresponding to the decrease in number of input bits.

By use of the table conversion on the basis of three input signals of correction amount ($\Delta E$), luminance, and color difference amount, it is possible to realize the processing apparatus which can effectively correct the color balance at a high speed with a simple constitution.

Figure 29:
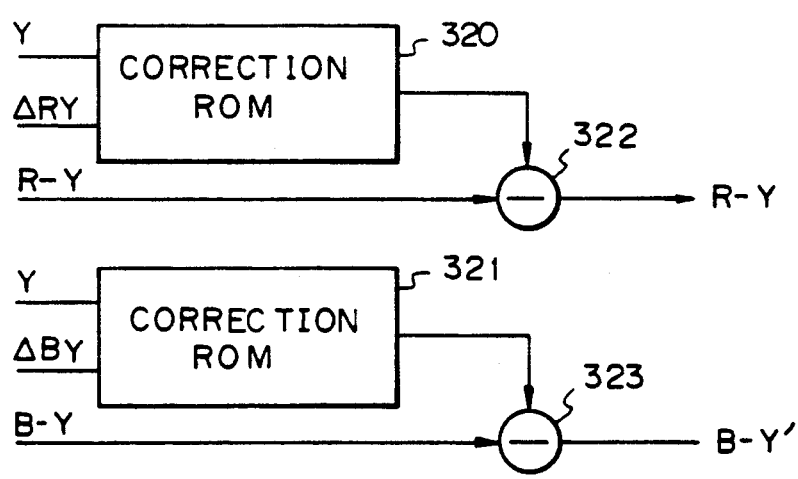
FIG. 29 is a circuit diagram of another embodiment of the color balance correction.

FIG. 29 shows a modified example of the correction circuit. In this example, in order to reduce the scale of the ROM, only the calculations of $\Delta R_Y \times Y/Y_{max}$ and $\Delta B_Y \times Y/Y_{max}$ in the foregoing equations are executed in the ROM and the subtractions are performed in subtracters 322 and 323.

As described above, according to the embodiment, the color difference amounts of the pixel of a predetermined luminance are regarded as the deviation of the color balance and the color correction is performed in accordance with the luminance on the basis of this deviation. Therefore, it is possible to provide the color image processing apparatus which can correct the color balance by a constant algorithm. If the predetermined luminance is set to the maximum luminance, the color balance can be more effectively corrected.

As described above, according to the invention, the useful color image process can be realized.

The present invention is not limited to the foregoing embodiments but many modifications and variations are possible within the spirit and scope of the appended claims of the invention,

What is claimed is:

1. A color image processing apparatus comprising:
    detecting means for detecting a pixel of a predetermined luminance from a color image signal consisting of a luminance signal and color difference signals;
    correction amount operating means for calculating correction amounts to the color difference signals of each of pixels constituting an image from the color difference signals of the pixels of a predetermined luminance; and
    correcting means for correcting the color difference signals of each of the pixels constituting the image in accordance with said correction amounts.

2. A color image processing apparatus according to claim 1, wherein said predetermined luminance is the maximum luminance.

3. A color image processing apparatus according to claim 2, wherein said correction amounts are obtained by proportionally distributing the color differences regarding the pixel of the maximum luminance in accordance with a ratio of the luminances of the respective component pixels of the image for said maximum luminance.

4. A color image processing apparatus according to claim 1, wherein said correcting means subtracts said correction amounts from the color differences of each component pixel of the image.

5. A color image processing apparatus comprising:
    detecting means for detecting a plurality of pixels of a high saturation from a color image signal consisting of a luminance signal and color difference signals;
    operating means for calculating the average value of the color difference signals of said plurality of high luminance pixels; and
    correcting means for correcting the color difference signals of each of the pixels constituting the image using said average value as a maximum correction amount.

6. A color image processing apparatus according to claim 5, wherein said plurality of high luminance pixels include the pixel of the maximum luminance.

7. A color image processing apparatus according to claim 6, wherein said correcting means subtracts the amounts derived by proportionally distributing the average value in accordance with the ratio of the luminances of the respective component pixels of the image to the maximum luminance from the color differences of each component pixel of the image.

8. A color image processing apparatus comprising:
    means for providing a color image signal consisting of a luminance signal and color difference signals;
    detecting means for detecting the color difference signals of a pixel of a high luminance from the color image signal;
    a conversion table of correction amounts for correcting the color difference signals of each of the pixels constituting the image of said color image signal; and
    correcting means for subtracting the correction amounts from said conversion table from the color difference signals of each component pixel of the image,
    wherein the luminance signal and color difference signals of the pixel to be corrected and the color difference signals of one or a plurality of pixels are input to said conversion table.

9. A color image processing apparatus according to claim 8, wherein said detecting means detects one pixel of the maximum luminance.

10. A color image processing apparatus according to claim 8, wherein said detecting means detects a plurality of pixels of a high luminance below the maximum luminance and outputs the average value of the color differences of said plurality of high luminance pixels.

11. A color image processing apparatus according to claim 8, wherein said conversion table is a memory in which the color differences as outputs of said detecting means are previously proportionally distributed in accordance with the ratio of the luminances of the respective component pixels of the image for a predetermined luminance and the resultant color differences are stored.

12. A color image processing method comprising the steps of:
    detecting a highlight point in a color image;
    detecting a color component of the detected highlight point;
    supplying a luminance component of the color image other than that of the highlight point; and
    correcting a color component other than that of the highlight point in accordance with the luminance component and the detected color component.

13. A color image processing method according to claim 12, wherein the color component other than the color component of the highlight point is a signal represented by a color difference signal.

14. A color image processing method according to claim 13, further comprising the step of converting the color difference signal into a hue signal and a saturation signal.

15. A color image processing method according to claim 14, further comprising the step of outputting Y, M and C signals on the basis of the hue signal, saturation signal and luminance component.

16. A color image processing method according to claim 15, further comprising the step of supplying the Y, M and C signals to a recording means.

17. A digital color image processing apparatus comprising:
   highlight point detecting means for detecting a highlight point in a color image;
   highlight point color component detecting means for detecting a color component of the detected highlight point;
   luminance signal supplying means for supplying a luminance component of the color image other than that of the highlight point; and
   correcting means for correcting a color component other than that of the highlight point in accordance with the luminance component and the detected color component.

18. A color image processing apparatus according to claim 17, wherein the color component other than the color component of the highlight point is a signal represented by a color difference signal.

19. A color image processing apparatus according to claim 18, further comprising converting means for converting the color difference signal to a hue signal and a saturation signal.

20. A color image processing method according to claim 19, further comprising outputting means for outputting Y, M and C signals on the basis of the hue signal, saturation signal and luminance component.

21. A color image processing apparatus according to claim 20, further comprising color signal supplying means for supplying the Y, M and C signals to a recording means.

22. A digital color image forming method comprising the steps of:
   detecting a highlight point in a digital color image data;
   detecting a color component of the detected highlight point;
   correcting a digital color component of the digital color image data in accordance with the detected color component of the detected highlight point; and
   forming a printed color image in accordance with the corrected digital color image data.

23. A digital color image forming method according to claim 22, wherein, in said step of detecting a color component of the detected highlight point, an average is taken of the color components for a plurality of pixels of the highlight point.

24. A digital color image forming method according to claim 22, wherein, in said step of forming a printed color image, a printed color image is formed by ink jet recording means.

25. A digital color image forming method according to claim 22, wherein, in said step of forming a printed color image, a printed color image is formed in accordance with Y, M and C signals.

* * * * *

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

Page 1 of 9

It is certified that error appears in the above-identified patent and that said Letters Patent is hereby corrected as shown below:

On the title page, Item [54] and Column 1, line 2

"HIGHLIGHTS" should read --HIGHLIGHT--.

IN [60] RELATED U.S. APPLICATION DATA

"Jul. 29, 1990," should read --Jul. 27, 1990,--.

IN [57] ABSTRACT

Line 2, "consisting of" should read --comprising--.
Line 5, "the" should read --a-- and
"and" should read --and a--.
Line 6, "ranges" should read --range--.
Line 7, "of" (first occurrence) should be deleted.
Line 8, "signal and to output;" should read --signal;--.
Line 11, "saturation signal," should be deleted and
"luminance signal" should read --signals--.

COLUMN 1

Line 2, "HIGHTLIGHTS" should read --HIGHLIGHT--.
Line 7, "Jul. 29, 1990," should read --Jul. 27, 1990,--.
Line 19, "processes" should read --processes typically involved-- and "RGB" should read --R, G and B--.
Line 26, "tion." should read --tion:--.
Line 34, "such that the" should read --that--.
Line 37, "such that" should read --in which--.
Line 45, "such" should be deleted.
Line 49, "every" should read --for each--.
Line 51, "into" should read --in--.
Line 53, "RGB" should read --R, G and B--.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 1

Line 59, "RGB" should read --R, G and B--.
Line 60, "into," should read --in--.
Line 62, "case" should read --interest--.
Line 67, "such that" should read --that such--.

COLUMN 2

Line 2, "a" should be deleted.
Line 3, "certainly" should be deleted and "the" should be deleted.
Line 4, "a" should be deleted.
Line 13, "The method of the above item" should read --Method--.
Line 17, "The method of item" should read --Method--.
Line 28, "is fine." should read --is made increasingly fine.--.
Line 34, "the" should be deleted.
Line 49, "portion." should read --portion (i.e., not efficiently used).
Line 56, "provide" should read --provide a--.
Line 60, "provide" should read --provide a--.
Line 64, "provide" should read --provide a--.
Line 65, "which" should read --which,--.
Line 66, "even in the case of an" should read --regardless of the dynamic range of the-- and "signal having" should read --signal,--.
Line 67, "any dynamic range, the" should be deleted.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 3

Line 1, "provide" should read --provide a--.
Line 6, "provide" should read --provide a--.
Line 9, "the" should be deleted.
Line 11, "provide" should read --provide a--.
Line 16, "and the appended claims" should read --of the preferred embodiments, taken--.
Line 30, "RGB" should read --R, G and B--.
Line 44, "constitution" should read --construction--.
Line 47, "constitution" should read --construction--.
Line 50, "embodiment;" should read --embodiment of the invention;--.
Line 55, "approach" should read --make--.
Line 56, "to" should read --approach--.
Line 58, "embodiment;" should read --embodiment of the invention;--.
Line 60, "cess" should read --cessing-- and "embodiment;" should read --embodiment of the invention;--.
Line 62, "embodiment;" should read --embodiment of the invention;--.
Line 66, "at" should read --at a--.

COLUMN 4

Line 2, "embodiment;" should read --embodiment of the invention;--.
Line 3, "an" should be deleted.
Line 9, "according to" should read --of--.
Line 12, "correction" should read --correction,--.
Line 13, "embodiment;" should read --embodiment of the invention;--.

UNITED STATES PATENT AND TRADEMARK OFFICE
CERTIFICATE OF CORRECTION

PATENT NO. : 5,181,105

DATED : January 19, 1993

INVENTOR(S) : YOSHIRO UDAGAWA, ET AL.

It is certified that error appears in the above-identified patent and that said Letters Patent is hereby corrected as shown below:

COLUMN 4

Line 29, "An" should read --The preferred--.
Line 39, "RGB" should read --R, G and B--.
Line 40, "into" should read --in--.
Line 42, "operated" should read --operated upon--.
Line 57, "the" should be deleted.
Line 58, "of the" should be deleted.
Line 59, "the" should be deleted.
Line 61, "such that the" should read --of holding-- and "is held and" should read --and comprising--.
Line 62, "range is compressed," should read --range,-- and "either one of" should be deleted.
Line 63, "and" should be deleted.
Line 64, "sion" should read --sion (noth both)--.

COLUMN 5

Line 12, "RGB" should read --R, G and B-- and "were" should read --are--.
Line 13, "into" should read --in-- and "matrix operated" should read --matrix-operated--.
Line 15, "matrix." should read --matrix:--.
Line 22, "into" should read --in--.
Line 29, "RGB" should read --R, G and B-- and "into" should read --in--.
Line 30, "were" should read --are--.
Line 34, "RGB" should read --R, G and B-- and "matrix" should read --matrix- --.
Line 35, "operated" should read --operated upon--.
Line 36, "into" should read --in--.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 5

Line 50, "range is not narrowed" should read --range not be narrowed any more than necessary.--.
Line 51, "as possible." should be deleted.
Line 60, "into" should read --in--.
Line 61, "an" should read --a--.
Line 67, "the" should be deleted.
Line 68, "and" should read --and as--.

COLUMN 6

Line 2, "like." should read --like (if such implementation is desired).
Line 24, "an" should read --a--.
Line 40, "into" should read --in--.
Line 49, "the" should be deleted.
Line 62, "by the RGB" should read --obtained with R, G and B--.
Line 63, "fairly" should read --considerably--.
Line 64, "by" should read --obtained with--.
Line 68, "were" should read --are--.

COLUMN 7

Line 21, "by the RGB" should read --of the R, G and B-- and "fairly" should be deleted.
Line 22, "by" should read --of--.
Line 25, "so largely" should read --deteriorate excessively.--
Line 26, "deteriorate." should be deleted.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 7

Line 30, "the portion of a low saturation." should read --the low saturation region.--.
Line 39, "were" should read --are--.
Line 45, "the" should be deleted.

COLUMN 8

Line 39, "ink." should read --ink:--.
Line 47, "where," should read --where--.
Line 55, "bits" should read --bits being--.
Line 64, "RGB" should read --R, G and B-- and "were" should read --are--.
Line 65, "the" (second occurrence) should be deleted.
Line 66, "constitute" should read --constitute the system--.
Line 67, "after" should be deleted; "RGB" should read --R, G and B--; "were" should read --are--; and "matrix" should read --matrix- --.

COLUMN 9

Line 7, "such" and "the" should be deleted.
Line 10, "that" should read --that this also solves-- and "problem in the conventional exam-" should read --problem described above in reference to the conventional system as ocurring--.
Line 11, "ple is simultaneously solved, namely, "For example," should be deleted.
Line 13, "in" should read --is e.g.,--.
Line 15, "image."." should read --image.--.
Line 16, "by" should read --for--.
Line 25, "the" should be deleted.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 10

Line 36, "to" should read --to a value of--.
Line 37, "of" should read --of a--.
Line 60, "RGB" should read --R, G and B--.
Line 62, "G," should read --G--.
Line 63, "G," should read --G--.

COLUMN 11

Line 9, "where," should read --where--.
Line 17, "lines" should read --lines are--.
Line 23, "an" should read --a--.
Line 36, "G," should read --G--.
Line 37, "RGB" should read --R, G and B-- and "122." should read --122:--.
Line 46, "123." should read --123:--.
Line 55, "ink." should read --ink:--.
Line 63, "where," should read --where--.

COLUMN 12

Line 4, "other" should read --other specified--.
Line 6, "the" should read --the present--.
Line 7, "approaching" should read --approximating--.
Line 9, "can feel" should read --will deem--.
Line 26, "an" should read --a--.
Line 28, "Such a data that the portion of a" should read --Data whose--.
Line 29, "low saturation was" should read --low-saturation portion has been-- and "the portion of a" should be deleted.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 12

Line 30, "high saturation was" should read --high-saturation has been-- and "previously" should read --in advance--.
Line 67, "the point is" should read --one moves--.
Line 68, "extended" should be deleted and "outside" should read --outside away--.

COLUMN 13

Line 23, "an" should read --a--.
Line 63, "an" should read --due--.

COLUMN 14

Line 9, "RGB" should read --R, G and B--.
Line 12, "few" should read --large number of--.

COLUMN 15

Line 24, "an" should read --a--.
Line 32, "ory" should read --ory.--.
Line 39, "$\Delta E$," should read --$\Delta E$, the value for--.
Line 40, "such" should be deleted.
Line 41, "becomes" should read --might become--.
Line 57, "thin-out" should read --thinned-out--.
Line 58, "be also" should read --also be--.

UNITED STATES PATENT AND TRADEMARK OFFICE
CERTIFICATE OF CORRECTION

PATENT NO. : 5,181,105
DATED : January 19, 1993
INVENTOR(S) : YOSHIRO UDAGAWA, ET AL.

It is certified that error appears in the above-identified patent and that said Letters Patent is hereby corrected as shown below:

COLUMN 17

Line 40, "invention," should read --invention.--.
Line 60, "differences" should read --difference signals--.
Line 67, "differences" should read --difference signals--.

COLUMN 18

Line 21, "differences" should read --difference signals--.

Signed and Sealed this

Eighth Day of February, 1994

Attest:

BRUCE LEHMAN

Attesting Officer

Commissioner of Patents and Trademarks